(12) United States Patent
Ma

(10) Patent No.: US 11,365,557 B2
(45) Date of Patent: Jun. 21, 2022

(54) MOVABLE BASE FOR SHADE STRUCTURE

(71) Applicant: Zhun-An Ma, Ningbo (CN)

(72) Inventor: Zhun-An Ma, Ningbo (CN)

(*) Notice: Subject to any disclaimer, the term of this patent is extended or adjusted under 35 U.S.C. 154(b) by 166 days.

(21) Appl. No.: 16/727,741

(22) Filed: Dec. 26, 2019

(65) Prior Publication Data

US 2020/0208429 A1 Jul. 2, 2020

Related U.S. Application Data

(60) Provisional application No. 62/785,407, filed on Dec. 27, 2018.

(51) Int. Cl.
| | |
|---|---|
| *E04H 12/22* | (2006.01) |
| *B62B 5/04* | (2006.01) |
| *A45B 25/00* | (2006.01) |
| *A45B 23/00* | (2006.01) |

(52) U.S. Cl.
CPC ......... *E04H 12/2238* (2013.01); *A45B 25/00* (2013.01); *B62B 5/049* (2013.01); *A45B 2023/0012* (2013.01); *A45B 2025/003* (2013.01)

(58) Field of Classification Search
CPC . E04H 12/2238; B62B 5/049; B62B 2202/30; B62B 5/0433; B62B 5/0093; A45B 25/00; A45B 2023/0012; A45B 2025/003
USPC ............................. 248/346.01, 519, 680, 129
See application file for complete search history.

(56) References Cited

U.S. PATENT DOCUMENTS

| | | | |
|---|---|---|---|
| 1,261,142 A | 4/1918 | McNichol | |
| 1,711,831 A | 5/1929 | Clavin | |
| 1,838,199 A | 12/1931 | Thomas | |
| 1,940,523 A | 12/1933 | Barclay | |
| 2,036,033 A | 3/1936 | Fisher | |
| 2,146,658 A | 2/1939 | Leopold | |
| 2,475,406 A | 7/1949 | Russell | |
| 2,652,845 A | 9/1953 | O'Neill et al. | |
| 2,661,012 A | 12/1953 | Militano | |
| 2,952,471 A | 9/1960 | Thorpe | |
| 3,025,058 A | 3/1962 | Brumfield | |
| 3,119,588 A | 1/1964 | Keats | |
| 3,179,438 A | 4/1965 | Field | |
| 3,259,432 A | 7/1966 | Jackson | |
| 3,353,837 A | 11/1967 | Marcyan | |

(Continued)

FOREIGN PATENT DOCUMENTS

| | | |
|---|---|---|
| DE | 93 13 372 | 10/1993 |
| DE | 202006002271 U1 | 6/2006 |

(Continued)

OTHER PUBLICATIONS

Activa Leisure, 2010 Product Catalog.

(Continued)

*Primary Examiner* — Muhammad Ijaz

(74) *Attorney, Agent, or Firm* — Knobbe, Martens, Olson & Bear, LLP

(57) ABSTRACT

A movable base for a shade structure, such as an umbrella, operable between a movable position and a fixed position. The movable base including a foot pedal to transition between the movable and fixed positions. In one example, the foot pedal operates a locking assembly, such as a plate or linkage assembly that engages with the ground in the fixed position and is raised from the ground in the movable positions.

23 Claims, 21 Drawing Sheets

(56) References Cited

U.S. PATENT DOCUMENTS

| | | |
|---|---|---|
| 3,372,855 A | 3/1968 | Keith |
| 3,606,445 A | 9/1971 | Wunderlich |
| 3,632,029 A | 1/1972 | Sonner |
| 3,633,242 A * | 1/1972 | Wasofsky ............... B60B 33/06 16/34 |
| 3,635,491 A | 1/1972 | Drews et al. |
| D223,689 S | 5/1972 | Forbes |
| 3,841,631 A | 10/1974 | Dolan |
| 3,949,901 A | 4/1976 | Tokita |
| 4,000,750 A | 1/1977 | Becher |
| 4,063,616 A | 12/1977 | Gutierrez |
| D255,958 S | 7/1980 | Browning |
| 4,249,282 A | 2/1981 | Little |
| 4,296,693 A | 10/1981 | Archer |
| 4,591,126 A | 5/1986 | Berney |
| D286,116 S | 10/1986 | Tegze |
| D295,004 S | 4/1988 | Schulz |
| 4,790,029 A | 12/1988 | LaFleur et al. |
| D305,702 S | 1/1990 | Taliani et al. |
| 4,903,859 A | 2/1990 | Derby et al. |
| 4,973,327 A | 11/1990 | Goodrich, Jr. et al. |
| D323,582 S | 2/1992 | Volcani |
| 5,104,236 A | 4/1992 | LaFleur |
| 5,152,495 A | 10/1992 | Jacinto et al. |
| 5,158,369 A | 10/1992 | Derby |
| 5,167,393 A | 12/1992 | Hayakawa et al. |
| 5,207,407 A | 5/1993 | Fitzsimmons et al. |
| 5,209,364 A | 5/1993 | LaPoint, Jr. |
| 5,220,740 A | 6/1993 | Brault |
| 5,248,140 A | 9/1993 | Matherne et al. |
| 5,257,983 A | 11/1993 | Garyantes et al. |
| 5,259,612 A | 11/1993 | Matherne et al. |
| 5,271,196 A | 12/1993 | Fanti |
| 5,283,595 A | 2/1994 | Krukovsky |
| 5,289,937 A | 3/1994 | Boots |
| 5,322,023 A | 6/1994 | Hammond |
| 5,323,922 A | 6/1994 | Lapoint et al. |
| 5,328,268 A | 7/1994 | Lafleur |
| 5,330,213 A | 7/1994 | Peruso |
| D350,041 S | 8/1994 | Schwarzli |
| 5,337,989 A | 8/1994 | Apple |
| 5,354,049 A | 10/1994 | Matherne et al. |
| 5,375,835 A | 12/1994 | Van Nimwegen et al. |
| 5,423,611 A | 6/1995 | Sherrard |
| 5,465,529 A | 11/1995 | Park |
| 5,480,191 A | 1/1996 | Litin et al. |
| 5,481,822 A | 1/1996 | Engels |
| 5,492,429 A | 2/1996 | Hodges |
| 5,520,982 A | 5/1996 | Grigsby et al. |
| D371,902 S | 7/1996 | Lee |
| 5,538,155 A | 7/1996 | Hoekstra |
| 5,599,037 A | 2/1997 | Spickler |
| 5,615,451 A | 4/1997 | Peterson et al. |
| 5,628,522 A | 5/1997 | Hall |
| 5,628,523 A | 5/1997 | Smith |
| 5,636,649 A | 6/1997 | Horvath |
| 5,730,668 A | 3/1998 | Hege et al. |
| 5,743,283 A | 4/1998 | Horvath |
| 5,823,213 A | 10/1998 | Patarra |
| 5,826,850 A | 10/1998 | Goldsmith |
| 5,839,714 A | 11/1998 | Fitzsimmons et al. |
| 5,843,556 A | 12/1998 | Levas |
| 5,865,541 A | 2/1999 | Lafleur |
| 5,871,148 A | 2/1999 | Hafer |
| D411,341 S | 6/1999 | Lee |
| D411,342 S | 6/1999 | Lee |
| 5,940,932 A | 8/1999 | LaHay |
| 5,957,145 A | 9/1999 | Plumer |
| 5,964,533 A | 10/1999 | Ziglar |
| 5,968,204 A | 10/1999 | Wise |
| 5,979,793 A | 11/1999 | Louis |
| 6,000,549 A | 12/1999 | Perkins |
| 6,015,057 A | 1/2000 | Stone et al. |
| D426,985 S | 6/2000 | Casalino |
| 6,089,394 A | 7/2000 | Ziglar |
| 6,102,569 A | 8/2000 | Wang |
| 6,105,305 A | 8/2000 | Edens |
| 6,109,786 A | 8/2000 | Hafer et al. |
| 6,113,054 A | 9/2000 | Ma |
| 6,113,270 A | 9/2000 | Hafer |
| 6,149,025 A | 11/2000 | Wang |
| 6,196,719 B1 | 3/2001 | Brown |
| 6,203,198 B1 | 3/2001 | Stone |
| 6,220,755 B1 | 4/2001 | Brown et al. |
| 6,230,724 B1 | 5/2001 | Lai |
| 6,305,659 B1 | 10/2001 | Metelski |
| 6,328,470 B2 | 12/2001 | Brown et al. |
| 6,336,450 B1 | 1/2002 | Collet |
| 6,367,494 B1 | 4/2002 | Tung |
| 6,374,839 B2 | 4/2002 | Patarra |
| 6,405,990 B1 | 6/2002 | Davis et al. |
| 6,412,746 B2 | 7/2002 | Davis et al. |
| 6,412,747 B2 | 7/2002 | Davis et al. |
| 6,415,927 B1 | 7/2002 | Stone et al. |
| 6,446,408 B1 | 9/2002 | Gordin et al. |
| 6,446,930 B1 | 9/2002 | Li |
| D464,190 S | 10/2002 | Salahub |
| 6,481,591 B2 | 11/2002 | Mendoza et al. |
| 6,488,254 B2 | 12/2002 | Li |
| 6,511,033 B2 | 1/2003 | Li |
| D470,305 S | 2/2003 | Clarke |
| 6,523,640 B1 | 2/2003 | Young et al. |
| 6,554,012 B2 | 4/2003 | Patarra |
| 6,554,243 B2 | 4/2003 | Davis et al. |
| 6,565,060 B2 | 5/2003 | Li et al. |
| 6,594,951 B1 | 7/2003 | Reynolds |
| 6,637,717 B2 | 10/2003 | Li |
| D484,303 S | 12/2003 | Taylor |
| 6,658,760 B2 | 12/2003 | Kohlman et al. |
| 6,669,045 B2 | 12/2003 | Wang |
| D485,055 S | 1/2004 | Taylor |
| 6,682,055 B1 | 1/2004 | Tomlinson et al. |
| 6,732,752 B2 | 5/2004 | Cohen et al. |
| 6,796,319 B1 | 9/2004 | Patarra et al. |
| 6,869,058 B2 | 3/2005 | Tung |
| 6,877,708 B1 | 4/2005 | Thurner |
| 6,889,953 B2 | 5/2005 | Harbough |
| D516,297 S | 3/2006 | Smith et al. |
| 7,090,399 B2 | 8/2006 | Godshaw et al. |
| 7,140,581 B1 | 11/2006 | White |
| 7,143,601 B1 | 12/2006 | Jimenez |
| 7,163,212 B1 | 1/2007 | Rupp |
| 7,195,397 B2 | 3/2007 | Williamson et al. |
| 7,216,839 B2 | 5/2007 | Xiaoqiu |
| 7,285,111 B2 | 10/2007 | Gaster |
| 7,331,684 B2 | 2/2008 | Tung |
| 7,347,428 B2 | 3/2008 | Edenso |
| D568,603 S | 5/2008 | Smith et al. |
| D573,786 S | 7/2008 | Smith et al. |
| D574,143 S | 8/2008 | Smith et al. |
| D578,749 S | 10/2008 | Ng |
| 7,431,259 B2 | 10/2008 | Tung |
| 7,484,704 B2 | 2/2009 | Schommertz |
| 7,503,541 B2 | 3/2009 | Harold et al. |
| 7,513,479 B2 | 4/2009 | Li |
| 7,520,485 B1 | 4/2009 | Giannetto |
| 7,537,015 B1 | 5/2009 | Molnar, IV et al. |
| 7,575,117 B2 | 8/2009 | Redzisz et al. |
| 7,584,563 B2 | 9/2009 | Hillstrom et al. |
| 7,600,917 B2 | 10/2009 | Richardson, Jr. |
| 7,614,600 B1 * | 11/2009 | Smith ..................... G09F 23/00 248/910 |
| 7,641,165 B2 | 1/2010 | Li |
| 7,644,903 B2 | 1/2010 | Amato et al. |
| D612,146 S | 3/2010 | Clarke |
| D617,041 S | 6/2010 | Shi |
| 7,753,546 B2 | 7/2010 | Kuelbs |
| D621,148 S | 8/2010 | Brady |
| D621,149 S | 8/2010 | Brady |
| 7,780,139 B2 | 8/2010 | Markert |
| 7,784,761 B2 | 8/2010 | Ma |
| D625,528 S | 10/2010 | Sprague |
| 7,836,902 B2 | 11/2010 | Tung |
| 7,891,633 B2 | 2/2011 | Li |

(56) References Cited

U.S. PATENT DOCUMENTS

| | | |
|---|---|---|
| 7,958,901 B2 | 6/2011 | Lai |
| 8,070,006 B2 | 12/2011 | Austin et al. |
| 8,104,492 B2 | 1/2012 | Dan |
| D655,531 S | 3/2012 | Gharst |
| D668,443 S | 10/2012 | Sims, II |
| D677,075 S | 3/2013 | Rodgers |
| 8,485,757 B2 | 7/2013 | Nomoto |
| 8,522,804 B1 | 9/2013 | Tung |
| D691,839 S | 10/2013 | Dallenbach |
| 8,556,100 B2 | 10/2013 | Austin et al. |
| 8,567,729 B2 | 10/2013 | Nemish |
| D697,705 S | 1/2014 | Ma |
| 8,632,045 B2 * | 1/2014 | Ma .................. A45B 23/00 248/129 |
| 8,657,246 B2 | 2/2014 | Ma |
| 8,672,287 B2 | 3/2014 | Li |
| 8,714,511 B2 | 5/2014 | Zoeteman |
| 8,807,513 B2 | 8/2014 | Volin |
| 8,833,709 B2 * | 9/2014 | Weng ................ A45B 23/00 248/129 |
| 8,894,281 B2 | 11/2014 | Town et al. |
| 8,919,361 B2 | 12/2014 | Ma |
| 8,919,722 B2 | 12/2014 | Ma |
| D722,796 S | 2/2015 | Lievore |
| 8,960,625 B2 | 2/2015 | Ma |
| D724,309 S | 3/2015 | Ma |
| 9,038,325 B1 | 5/2015 | Callahan |
| D732,817 S | 6/2015 | Elstow |
| D740,546 S | 10/2015 | DeVaney |
| 9,271,550 B2 | 3/2016 | Xiong |
| D761,601 S | 7/2016 | Simmons |
| D768,978 S | 10/2016 | Ma |
| D775,461 S | 1/2017 | Ma |
| 9,540,840 B2 | 1/2017 | Ma |
| D785,380 S | 5/2017 | King |
| D817,631 S | 5/2018 | Weng |
| 9,957,728 B2 | 5/2018 | Ma |
| D833,136 S | 11/2018 | Ma |
| D855,967 S | 8/2019 | Ma |
| 2001/0013358 A1 | 8/2001 | Patarra |
| 2001/0032916 A1 | 10/2001 | Wess et al. |
| 2001/0040208 A1 | 11/2001 | Li |
| 2001/0045498 A1 | 11/2001 | Davis et al. |
| 2002/0023995 A1 | 2/2002 | Yoshida et al. |
| 2002/0185582 A1 | 12/2002 | Li |
| 2003/0145498 A1 | 8/2003 | Venegas, Jr. |
| 2003/0156891 A1 | 8/2003 | Hung et al. |
| 2003/0230692 A1 | 12/2003 | Davis et al. |
| 2004/0056169 A1 | 3/2004 | Harbough |
| 2004/0069922 A1 | 4/2004 | Wu |
| 2004/0108439 A1 | 6/2004 | Ma |
| 2004/0129854 A1 | 7/2004 | Schmitz |
| 2004/0163336 A1 | 8/2004 | Hsu |
| 2004/0177871 A1 | 9/2004 | Harbough |
| 2004/0195487 A1 | 10/2004 | Harbough |
| 2005/0161067 A1 | 7/2005 | Hollins |
| 2005/0189005 A1 | 9/2005 | Smith et al. |
| 2006/0054206 A1 | 3/2006 | Bilotti |
| 2006/0102822 A1 | 5/2006 | Liang |
| 2007/0080277 A1 | 4/2007 | Chen |
| 2008/0093528 A1 | 4/2008 | Tsai et al. |
| 2008/0111046 A1 | 5/2008 | Tung |
| 2009/0174162 A1 * | 7/2009 | Gass ...................... B60B 33/06 280/79.11 |
| 2009/0314912 A1 | 12/2009 | Whitley et al. |
| 2009/0320341 A1 | 12/2009 | Hillstrom et al. |
| 2010/0050706 A1 | 3/2010 | O'Neill |
| 2010/0065709 A1 | 3/2010 | Ying |
| 2010/0147341 A1 * | 6/2010 | Li ...................... E04H 12/2246 248/522 |
| 2010/0206346 A1 | 8/2010 | Tung |
| 2011/0232704 A1 | 9/2011 | Li |
| 2012/0024329 A1 * | 2/2012 | Ma ........................ F16M 7/00 280/30 |
| 2012/0024330 A1 * | 2/2012 | Ma ........................ A45B 23/00 280/30 |
| 2012/0025050 A1 * | 2/2012 | Ma ...................... E04H 12/2238 74/532 |
| 2012/0126388 A1 | 5/2012 | Kuo |
| 2013/0134285 A1 * | 5/2013 | Weng .................... F16M 11/42 248/523 |
| 2013/0146739 A1 | 6/2013 | Zhao |
| 2014/0230866 A1 | 8/2014 | Paolucci |
| 2014/0263926 A1 | 9/2014 | LeAnna |
| 2015/0076313 A1 | 3/2015 | Ma |
| 2017/0114563 A1 * | 4/2017 | Ye ........................ A45B 23/00 |
| 2019/0063103 A1 * | 2/2019 | Siegenthaler ....... E04H 12/2238 |
| 2019/0090964 A1 * | 3/2019 | Rosenberg ............ A61B 50/13 |
| 2019/0281720 A1 | 9/2019 | Jean et al. |
| 2019/0301670 A1 | 10/2019 | Glickstein et al. |
| 2020/0141150 A1 | 5/2020 | Ma |

FOREIGN PATENT DOCUMENTS

| | | |
|---|---|---|
| DE | 2020 1710 2218 U1 | 6/2017 |
| EP | 0 060 957 | 9/1982 |
| EP | 0 818 594 | 1/1998 |
| EP | 0 822 305 | 2/1998 |
| EP | 2565350 B1 | 12/2014 |
| FR | 2 576 048 | 7/1986 |

OTHER PUBLICATIONS

Treasure Garden, 2010 Product Catalog.
Extended European Search Report issued in European Patent Application No. 14185666.6, dated Jun. 24, 2015.

* cited by examiner

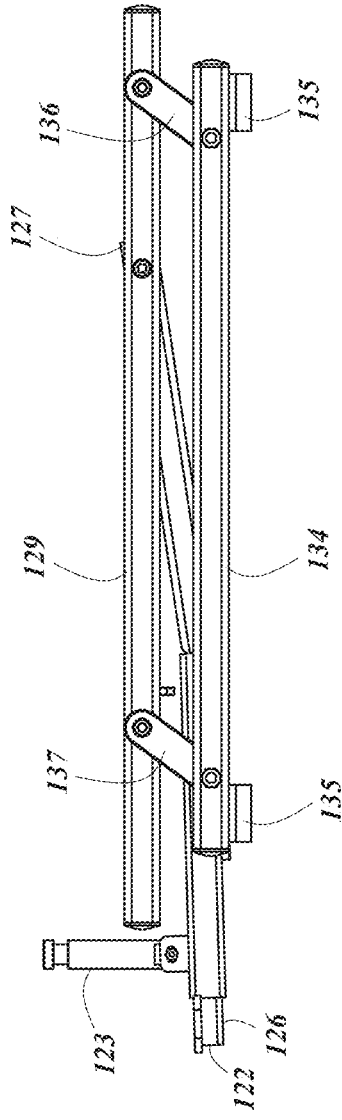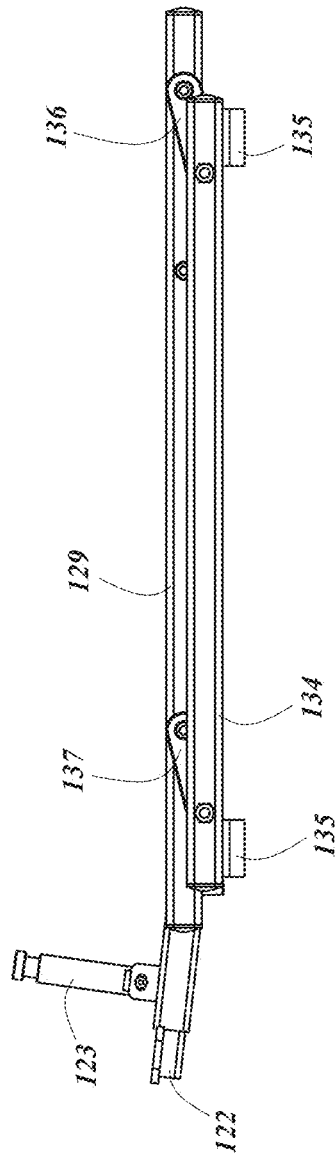

MOVABLE BASE FOR SHADE STRUCTURE

PRIORITY

This application claims the benefit of U.S. Patent Application No. 62/785,407, filed Dec. 27, 2018, the entirety of which is hereby incorporated by reference.

BACKGROUND

Field

The present disclosure generally relates to mobile bases for supporting an umbrella, or other structure.

Related Art

Large umbrellas and shade structures assemblies (collectively "umbrellas" herein) can be very difficult to move without a wheeled base because of the weight and/or shape of the umbrellas. However, movable bases can be problematic if the wheels allow for unwanted movement. Wind and other forces can move or turn the umbrella out of the desired position, especially when supported on a wheeled base.

SUMMARY

Improvements in arrangements for a movable base that can alternately allow and prevent movement of the umbrella are desirable.

One aspect of the present disclosure for a movable base is a brake assembly that can be engaged and disengaged to respectively prevent and allow movement of the movable base by a user. The brake assembly can be actuatable between the engaged and disengaged positions through a foot pedal or other actuator and locked therein by a locking mechanism.

Another aspect of the present disclosure is the brake assembly comprising a linkage assembly. For example, in one embodiment a movable base includes a frame having an mount for supporting a shade structure. A plurality of wheels couple to a lower portion of the frame. A brake assembly, includes a linkage assembly. The linkage assembly includes an upper member coupled with the frame and a lower member for engaging with a ground surface. A plurality of links pivotably couple with the upper member and lower member. A lever arm has a first end and a second end. The first end on the lever arm pivotably couples with the upper member. A central portion of the lever arm engages with a cross bar extending from the lower member. A foot pedal is at the second end of the lever arm. A locking device engages with the lever arm to hold the lever arm in a locked position. Rotation of the lever arm in a first direction extends the lower member away from the frame and into contact with the ground surface in the locked position. Releasing the lever arm from the locked position retracts the lower member from the ground surface.

Another aspect of the present disclosure is the brake assembly comprising a brake plate. For example, in one embodiment, a movable base includes a frame with a plurality of wheels coupled to a lower portion of the frame. The wheels support the frame on a ground surface. A plurality of struts couple between an outer periphery of the frame and a mount for an umbrella. A brake assembly, includes a brake plate for engaging a ground surface. A lever arm pivotably couples with one of the struts. A first end of the lever couples with a foot pedal. A second end of the lever arm couples with the brake plate. A locking device couples to the lever arm. The locking device alternately secures the brake plate in a disengaged position above the ground surface and an engaged position with the ground surface. In the disengaged position the foot pedal is depressed. In the engaged position the foot pedal is raised relative to the depressed position. The foot pedal travels vertically between the raised and depressed positions.

Summary of Certain Features

Various embodiments of this disclosure relate to movable bases. The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein. The systems, methods and devices described herein have innovative aspects, no single one of which is indispensable or solely responsible for their desirable attributes. Without limiting the scope of the claims, some of the advantageous features will now be summarized.

The various features and advantages of the systems, devices, and methods of the technology described herein will become more fully apparent from the following description of the embodiments illustrated in the figures. These embodiments are intended to illustrate the principles of this disclosure, and this disclosure should not be limited to merely the illustrated examples. The features of the illustrated embodiments can be modified, combined, removed, and/or substituted as will be apparent to those of ordinary skill in the art upon consideration of the principles disclosed herein.

BRIEF DESCRIPTION OF THE DRAWINGS

FIG. 5A is a side elevation view of the brake assembly in an engaged position.

FIG. 5B is a side elevation view of the brake assembly in a disengaged position.

DETAILED DESCRIPTION

Figure 1:
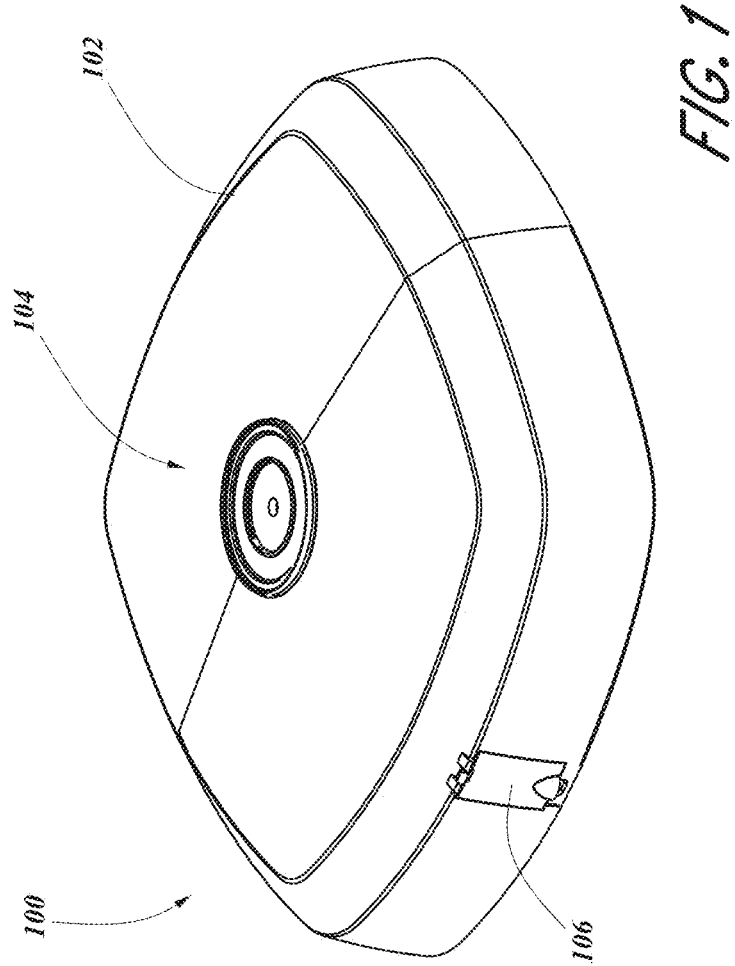
FIG. 1 is a perspective view of a first embodiment of a movable base.

FIG. 1 illustrates a movable base 100. The movable base 100 can be configured to rest on a ground surface, such as on a flat, even surface, although this is not required. The movable base 100 includes a mounting location 104 for mounting an umbrella or other similar shade structure assembly (collectively "umbrellas"). The mounting location 104 can include a plate member that has one or more apertures or other couplings for an attachment with an upright pole of the umbrella. The movable base 100 can stabilize and provide support to the umbrella.

The movable base 100 can include a shielding 102. The shielding 102 can be a shell that covers the interior components and assemblies of the movable base 100. In some instances, the shielding 102 is referred to as a cover or a housing. The shielding 102 can have an aesthetic design that can be desirable to a user. The shielding 102 can also protect the internal assemblies of the movable base 100 from the elements such as wind, rain, snow, sun, dust, dirt or other debris. The shielding 102 can include a flap or door 106. The flap 106 can cover an opening configured to provide access for a user to a foot pedal (optionally retractable) that can actuate a brake assembly to immobilize the movable base 100 in one configuration, as described further below. The flap or door 106 can alternately be at an outer periphery of the movable base or on a top portion thereof.

Figure 2:
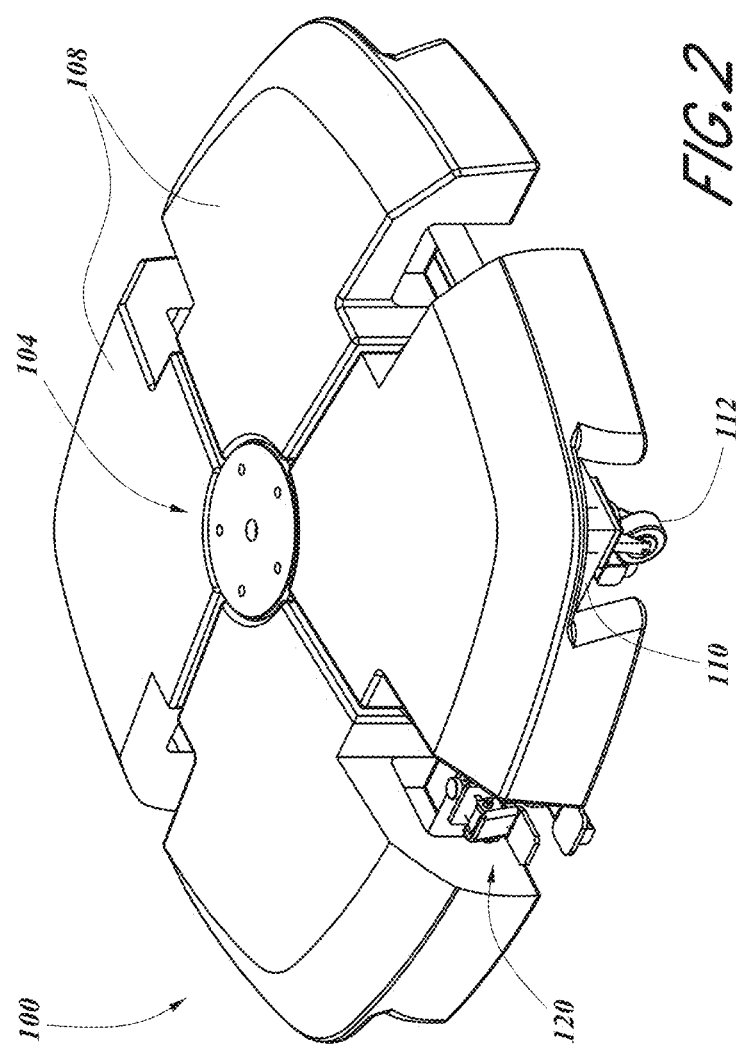
FIG. 2 is a perspective view of the movable base having an outer shielding removed. The shielding is sometimes referred to has a cover or a housing herein.

FIG. 2 illustrates internal components of the movable base 100 that are exposed with the shielding 102 removed. The movable base 100 can include a frame 110. The frame 110 can provide support to one or more ballast weights 108. The ballast weights 108 can be filled with ballast material such as water, sand, rocks or other materials. The ballast weights 108 can provide a counterweight for the umbrella attached with the movable base 100. The ballast weights 108 can be removable for ease of filling and/or assembling the movable base 100. The base 100 can have one or more weights in place of the one or more ballast weights 108.

The frame 110 can include a plurality of wheels 112 that can be used to support the weight of the movable base 100 and also to roll to move the base 100 and an umbrella coupled therewith. The wheels 112 can be of any design. In one particular embodiment, the wheels are caster-type wheel. The frame 110 can also include a brake assembly 120 for alternately allowing and restricting movement of the movable base 100 on the wheels 112.

Figure 3:
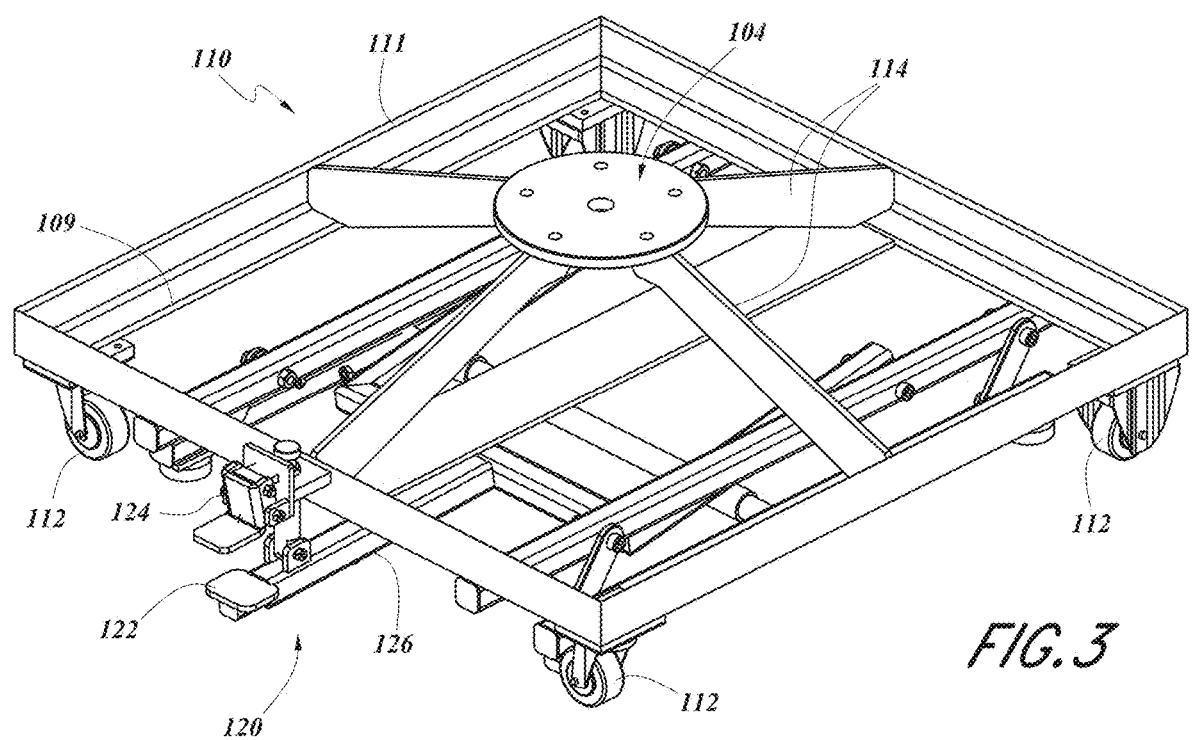
FIG. 3 is a perspective view of a frame of the movable base of FIG. 1.

FIG. 3 illustrates the frame 110 with the ballast weights 108 removed to show components disposed beneath the tanks. The frame 110 can include one or more upper supports 114 for supporting the mounting location 104. The upper supports 114 can be spaced symmetrically around the frame 110. The upper supports can define spaces for the ballast weights 108. The frame 110 can include an outer frame portion 111. The outer frame portion 111 can include an outer periphery made of one or more rigid members. The wheels 112 can be attached, directly or directly, to the outer frame portion 111. The outer frame portion 111 can have any desirable shape such as square, rectangular polygonal, circular, or other. In one implementation, as illustrated in FIG. 3, the outer frame portion 111 can be generally square-shaped. The upper supports 114 can be coupled with the outer frame portion 111. The outer frame portion 111 and/or shielding 102 can define an interior space 109 of the movable base 100.

The brake assembly 120 can include a foot pedal 122. The foot pedal 122 is an example of an actuator that can actuate the brake assembly. The foot pedal 122 can be connected with a lever arm 126 for providing to mechanically engage and disengage the brake assembly 120, as described further below. The brake assembly 120 can include a locking mechanism 124. The locking mechanism 124 can be configured to lock the position of the brake assembly 120 in an engaged position, as described further below. The locking mechanism 124 can include a latch (as described below) and can be coupled with the frame 110, such as at the outer frame portion 111 as illustrated.

Figure 4:
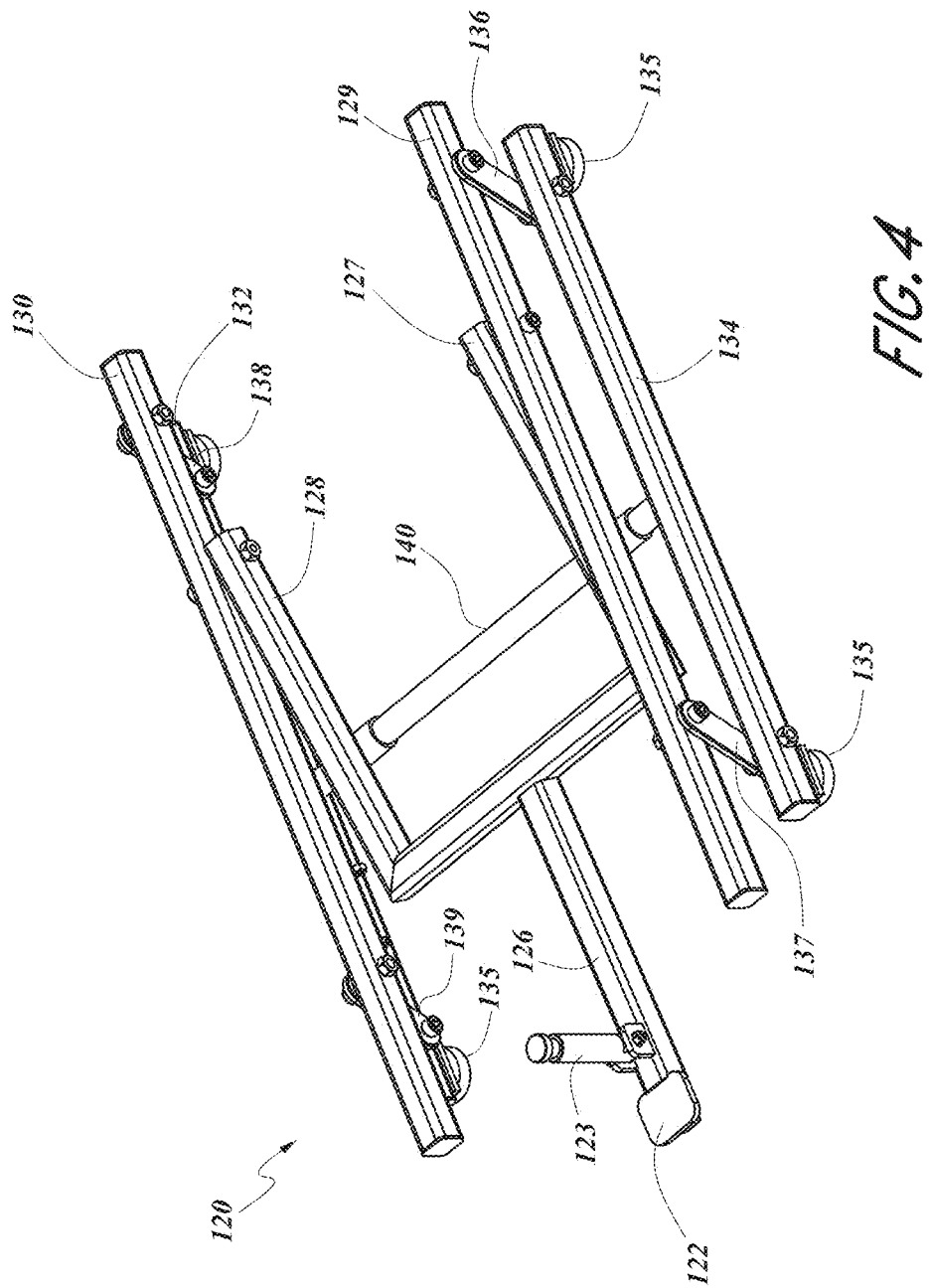
FIG. 4 is a bottom view of the frame showing a brake assembly.

FIG. 4 shows a further view of the brake assembly 120 and the frame 110. The lever arm 126 can engage with and actuate one or more multi-bar mechanisms, which can include, can be coupled with or can be considered contact assemblies. In one example, embodiment a first linkage assembly 162 (which can be a four-bar mechanism) can include the lower member 134, an upper member 129 and one or more links 136, 137. A second linkage assembly 164 (which can be a four-bar mechanism) can include the lower member 132, an upper member 130 and one or more links 138, 139.

The first and second linkage assemblies 162, 164 can be configured to be actuated by movement of the lever arm 126 at or extending from the foot pedal 122 by engaging an end of the lever arm 126 opposite the foot pedal 122 with a cross bar 140. The lever arm 126 can include a generally U-shaped or forked portion having two spaced apart end portions, e.g., ends 127 and 128. The cross bar 140 can be coupled with the lower members 132, 134. One or both of the ends 127 and 128 can be coupled with the upper members 129, 130 of the second linkage assemblies.

The links 136, 137 can be the same or different lengths. The links 136, 137 can be spaced apart the same distance on the lower member 134 and the upper member 129 to form a linkage assembly of the first and/or second linkage assemblies 162, 164. The linkage assembly can enable the lower members 132, 134 to be lowered and raised parallel with the ground. The linkage assembly can form a parallelogram in some configurations. The lower members 132, 134 can include one or more ground contact members 135 for engaging with a base surface or ground surface. The contact members 135 can include round members formed on, attached to, or extending from the lower members 132, 134. The contact members 135 can include high friction pads. The contact members 135 can be configured to resist wear.

The upper members 130, 129 can be fixed with respect to the frame 110 such as by being coupled with the outer frame portion 111. The lower members 134, 132 can be actuated to move outwardly or downwardly with respect to the frame 110 to engage with the ground by actuation of the foot pedal 122 via the lever arm 126.

FIGS. 5A and 5B show two positions of the brake assembly 120. In FIG. 5A the brake assembly 120 is shown with the lower member 134 in an extended or engaged position enabling the ground contact members 135 to engage with the ground surface. FIG. 5B illustrates the brake assembly 120 in a disengaged position with the lever arm 126 rotated upwards at the foot pedal 122 and the lower member 134 and the ground contact members 135 lifted away from the ground surface.

Figure 6:
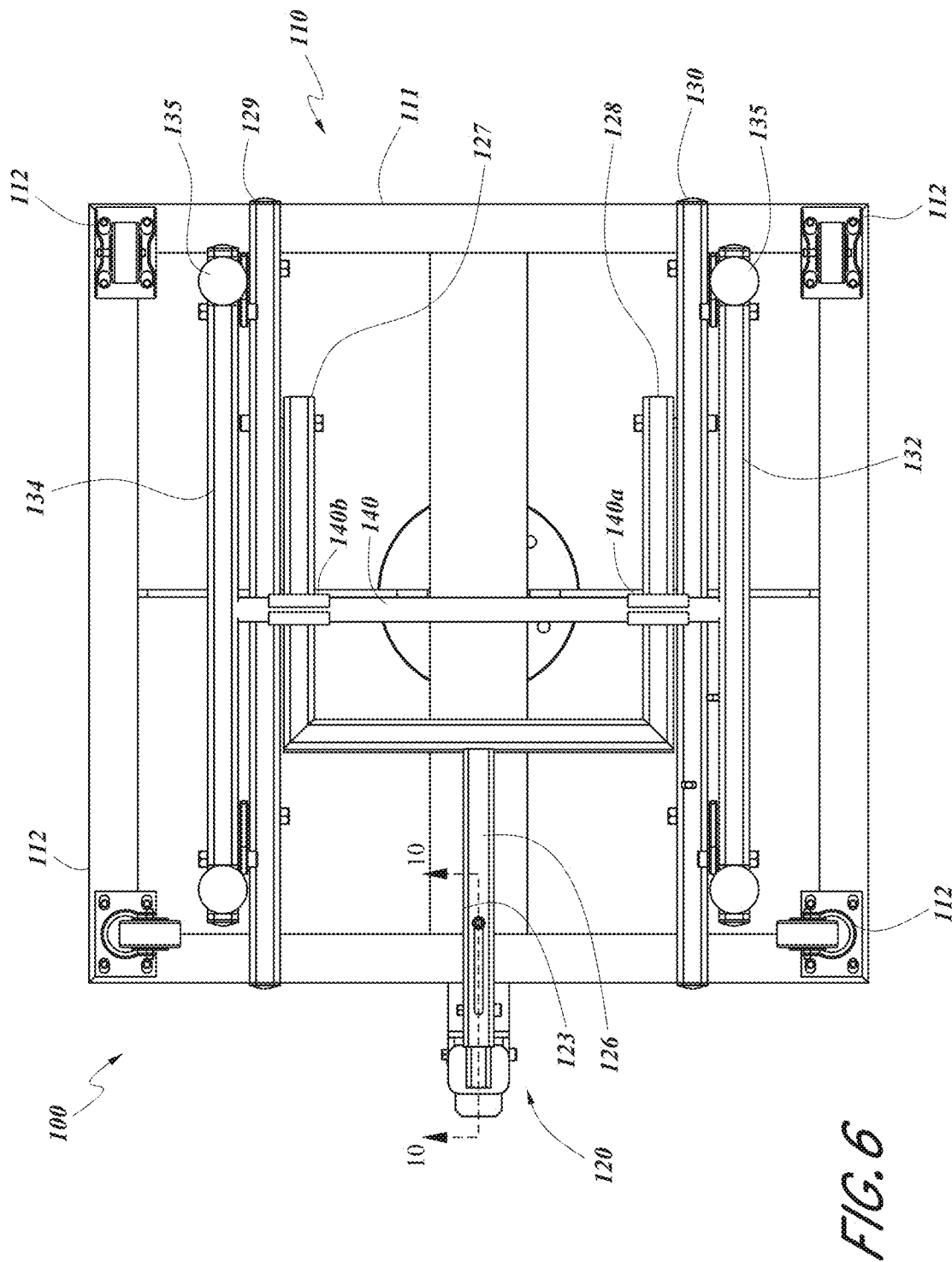
FIG. 6 is a bottom view of the brake assembly.

FIG. 6 shows a bottom view of the movable base 100. The foot pedal 122 can attach with the lever arm 126 via a sliding slot. For example, the foot pedal 122 can be received at least partially within a member of the lever arm 126 or vice versa (in some embodiments telescoped together). The foot pedal 122 can be thereby retractable (e.g., for storage beneath the shielding 102). The cross bar 140 can include one or more protective sleeves 140A, 140B. The protective sleeves 140A, 140B can be made out of metal, plastic or other material that can act to protect the cross bar 140 against wear and/or reduce noise when the lever arm 126 is actuated by a user. In one embodiment, the foot pedal 122 is coupled with the lever arm 126 by a vertical post (not shown). The foot pedal and vertical post can extends through the upper portion of the shielding 102 and/or hinged door 106.

Figure 7:
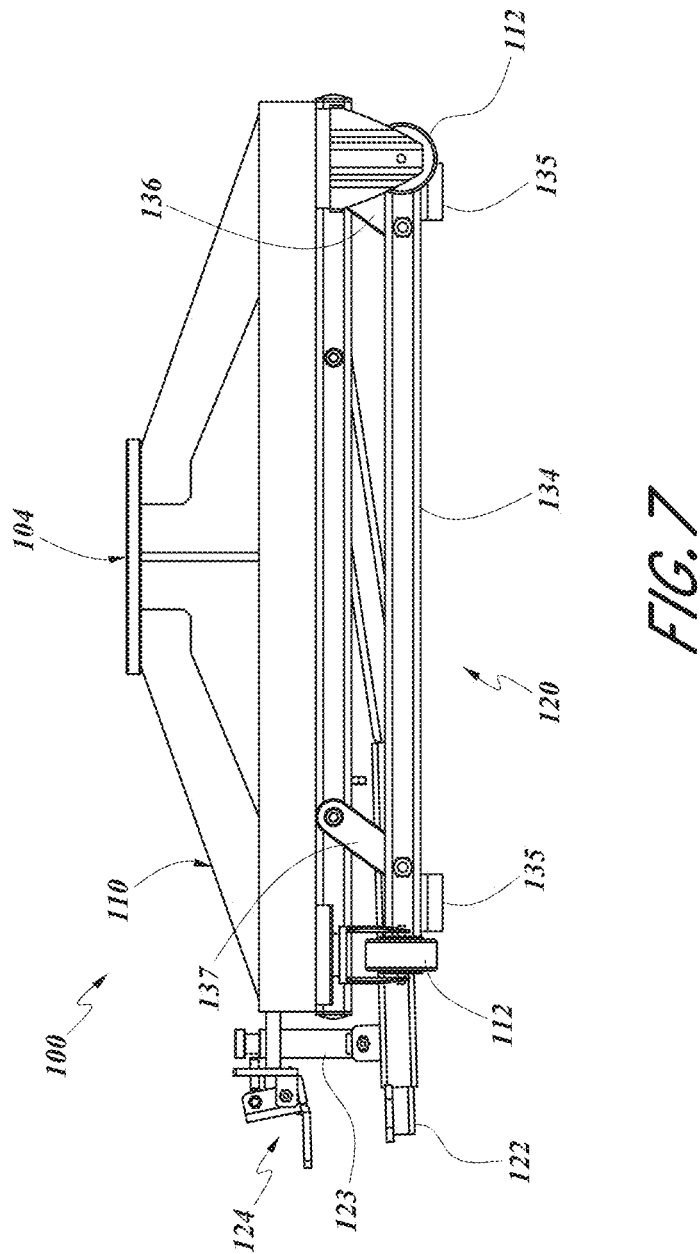
FIG. 7 is a side elevation view of the frame and the brake assembly in the engaged position.

FIG. 7 shows side view of the movable base 100 and the brake assembly in the engaged position. As shown the ground contact members 135 are at or below a level the wheels 112 engage the ground. By engaging the brake assembly 120 by actuating the foot pedal 122, the ground contact members 135 can engage the ground. The resulting friction can substantially prevent movement of the movable base 100.

Figure 8:
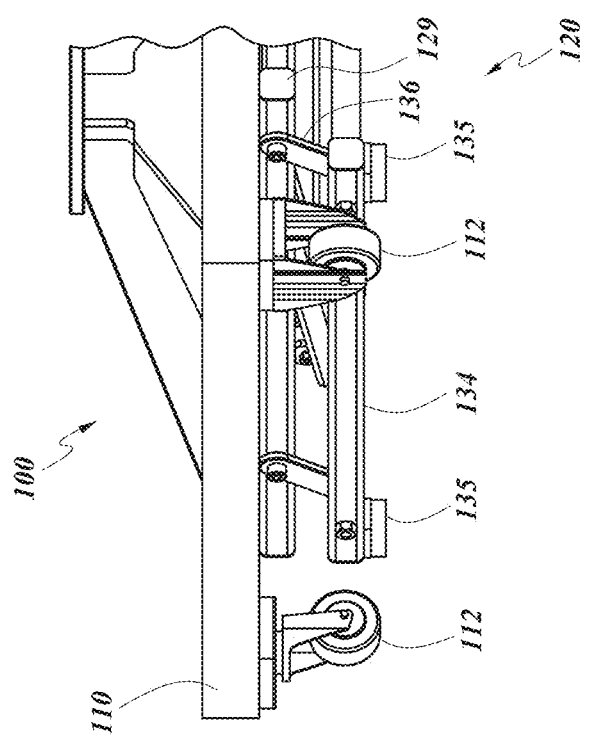
FIG. 8 is an enlarged side view showing the brake assembly in the disengaged position.

FIG. 8 shows the brake assembly 120 in the disengaged position with the linkage assemblies 162 and 164 and the ground contact members 135 lifted away from the ground. In this disengaged position, the entire weight of the movable base 100 (and umbrellas) is going to be through the wheels 112. The wheels 112 can have a rolling connection with the ground to enable to movement of the movable base 100 relatively easily in the disengaged position of the brake assembly.

Figure 9:
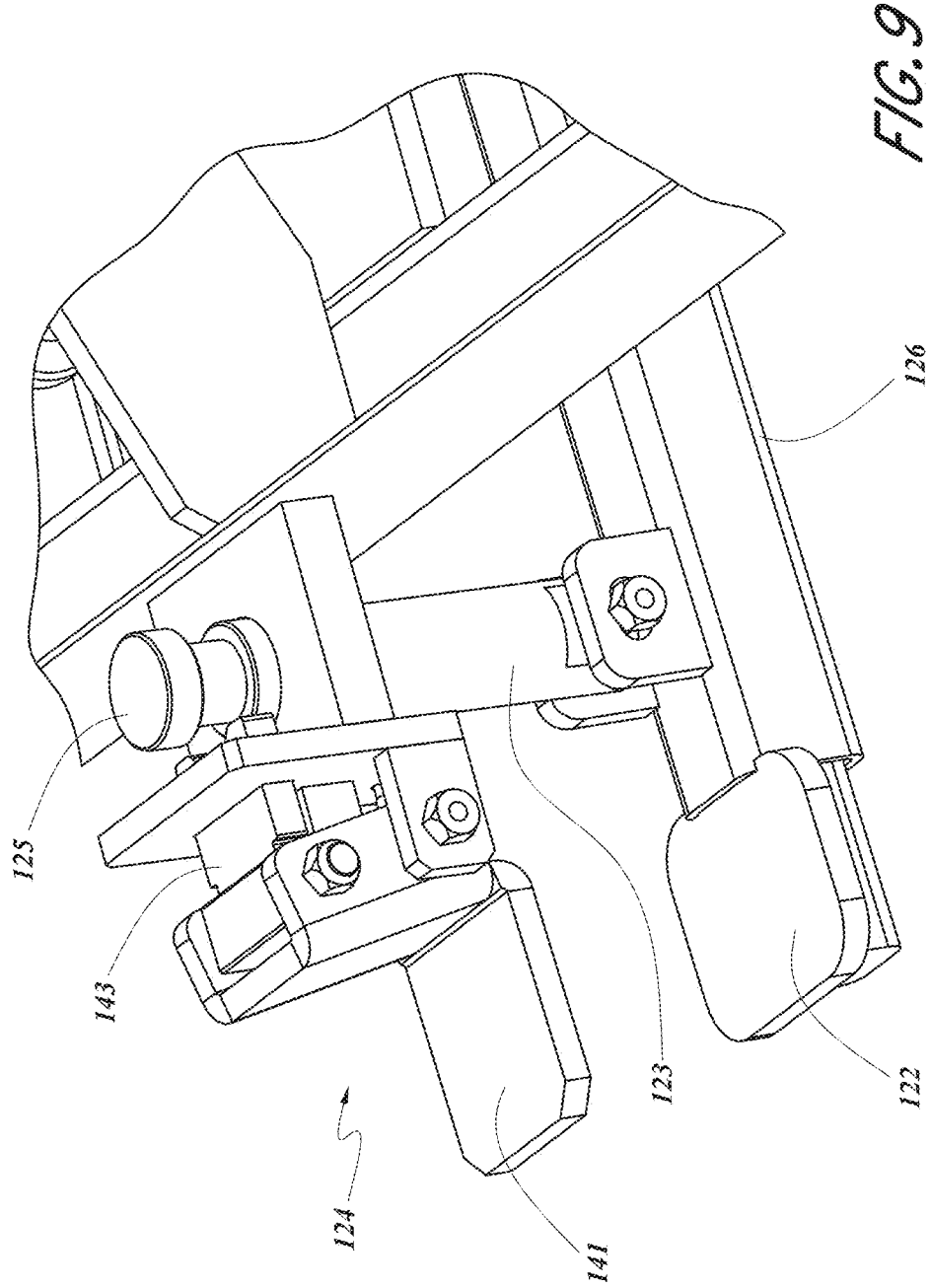
FIG. 9 is a perspective view showing a locking mechanism for the brake assembly.
Figure 10:
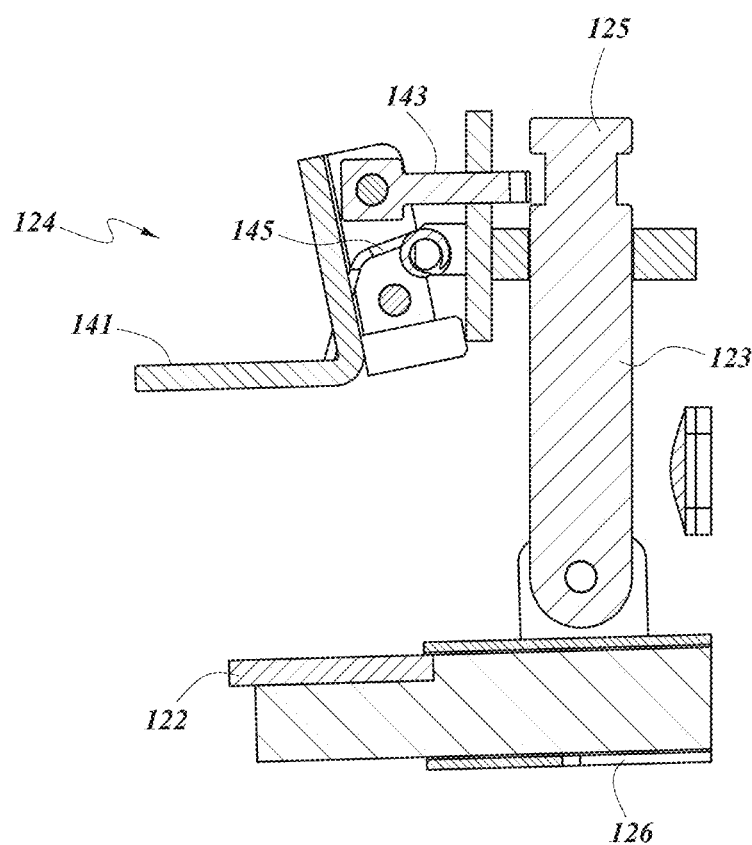
FIG. 10 is a cross-section view taken along the line 10-10 in FIG. 6.

FIG. 9 illustrates the locking mechanism 124. In the engaged position, the locking mechanism 124 can be coupled with an upright post 123 extending from the lever arm 126. The locking mechanism 124 can include a pedal 141. The pedal 141 can be spring actuated. The pedal 141 can be coupled pivotally with a latch member 143. The latch member 143 can engage with an upper end 125 of the upright post 123. The upper end 125 can include a groove for engaging with the latch member 143 for locking the post 123 and the lever arm 126 in the engaged position. In other implementations, the post 123 can include multiple spaced grooves and/or a ratchet mechanism. A user can utilize the brake assembly 120 by stepping on the foot pedal 122 which rotates the lever arm 126 downwards and pushes the linkage assemblies 162, 164 into the engaged positions with the ground. In the engaged position, the upper end 125 of the post 123 can engaged with the locking mechanism 124, such as at the latch member 143. The spring-loaded pedal 141 can push the latch member 143 into engagement with the upper end 125 to lock the position of the brake assembly 120 in the engaged position. In implementations with the multiple grooved post 123 and/or the ratchet mechanism, the user can select any one of a plurality of discrete levels of engagement of the linkage assemblies with the ground surface.

Figure 11:
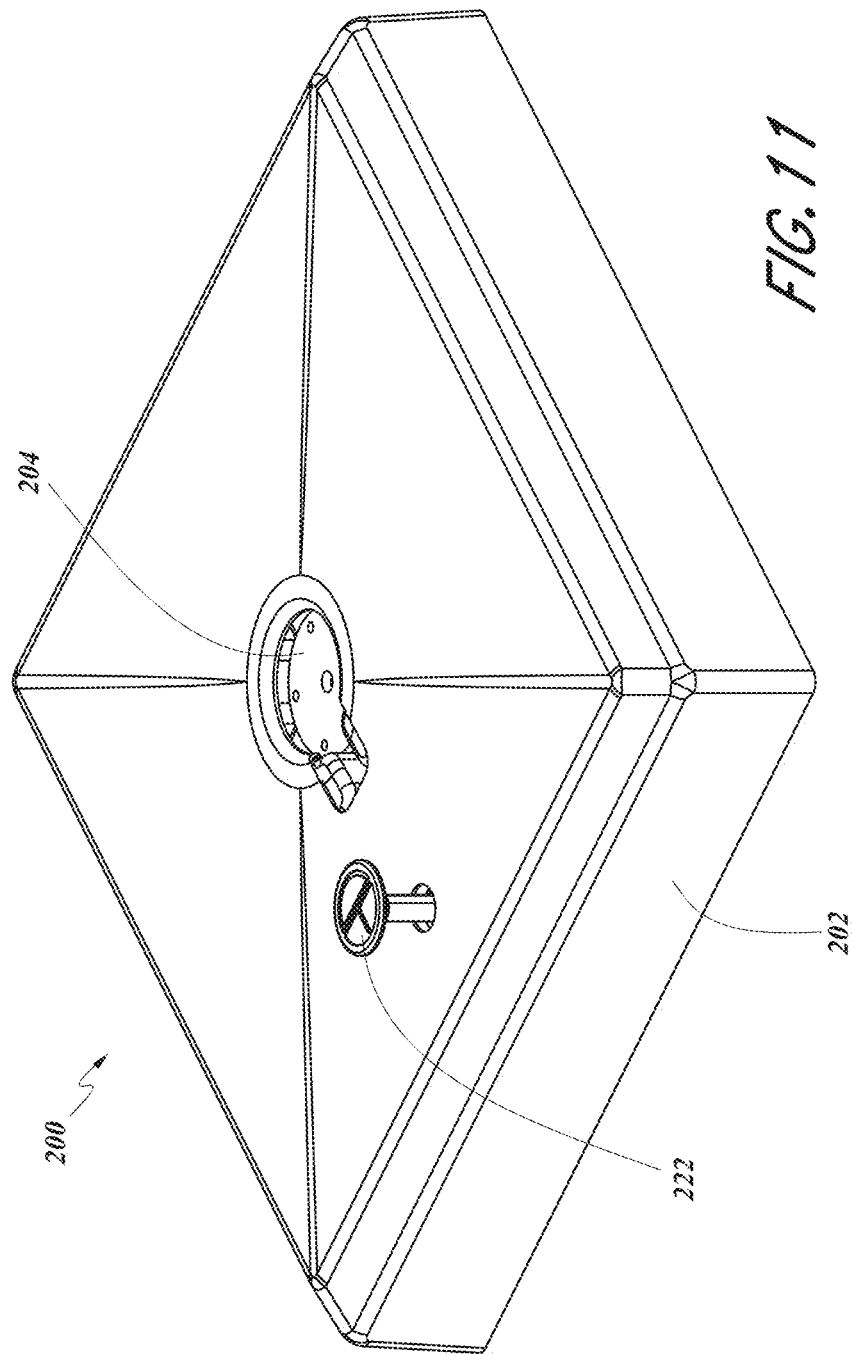
FIG. 11 is a perspective view that shows a second embodiment of a movable base.

FIG. 11 shows another embodiment of a movable base 200. The movable base 200 can be configured for supporting and moving an umbrella. The umbrella can be assembled with the movable base 200 at a mounting location 204. The mounting location 204 can be located on an upper portion of the movable base 200. A plate or other rigid support member can be disposed at the mounting location 204. The mounting location 204 can include one or more couplings (apertures or threaded apertures, etc.) for attaching an upright pole of the umbrella. The movable base 200 can include a shielding 202, similar to the shielding 102. The shielding 202 can be configured to provide protection for internal elements of the movable base 200 and/or for aesthetic purposes. The shielding 202 can include an aperture through which a foot pedal 222 is disposed. The foot pedal 222 can be coupled with a brake assembly, as described further below.

Figure 12:
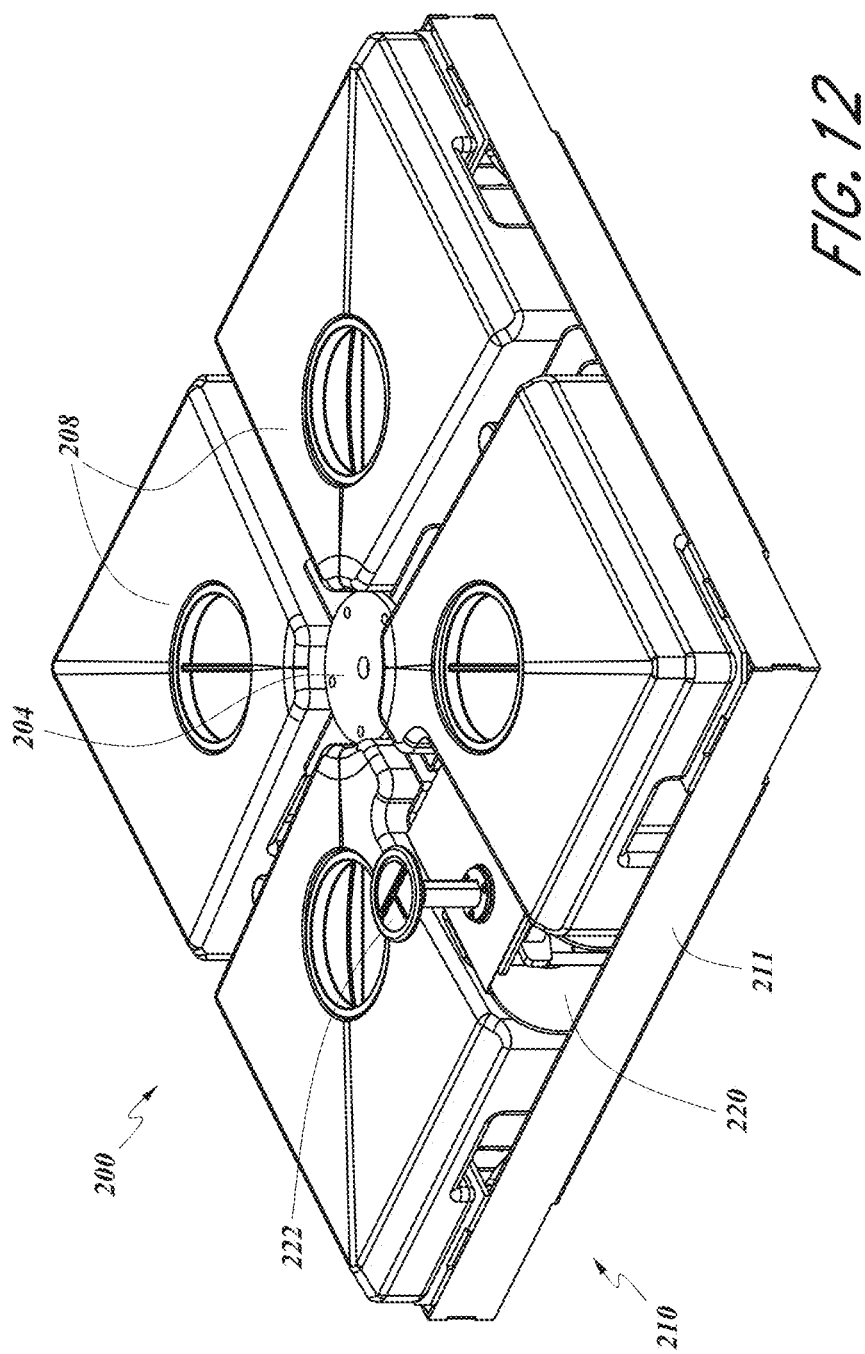
FIG. 12 shows the movable base of FIG. 11 with an outer shielding removed.

With reference to FIG. 12 the movable base 200 can include one or more ballast weights 208. The ballast weights 208 can nest within a frame 210 of the movable base 200. The ballast weights 208 can be configured to be filled with ballast materials. Optionally, the ballast weights 208 can include a closeable opening for preventing spillage of the ballast material. The ballast weights 208 can be removable from the frame 210 to facilitate shipping and/or assembly of the movable base 200. As discussed above, one or more of the ballast weights 208 can be weights of generally the same shape as illustrated but without requiring an internal space for filling.

FIG. 12 shows a brake assembly 220 that includes the foot pedal 222. The brake assembly 220 can be coupled with the frame 210. The frame 210 can include an outer peripheral frame portion 211. The outer peripheral frame portion 211 can define spaces in which the ballast weights 208 can be assembled or disposed. The outer peripheral frame portion 211 can have any shape, similar to the outer frame portion 111 described above.

Figure 13:
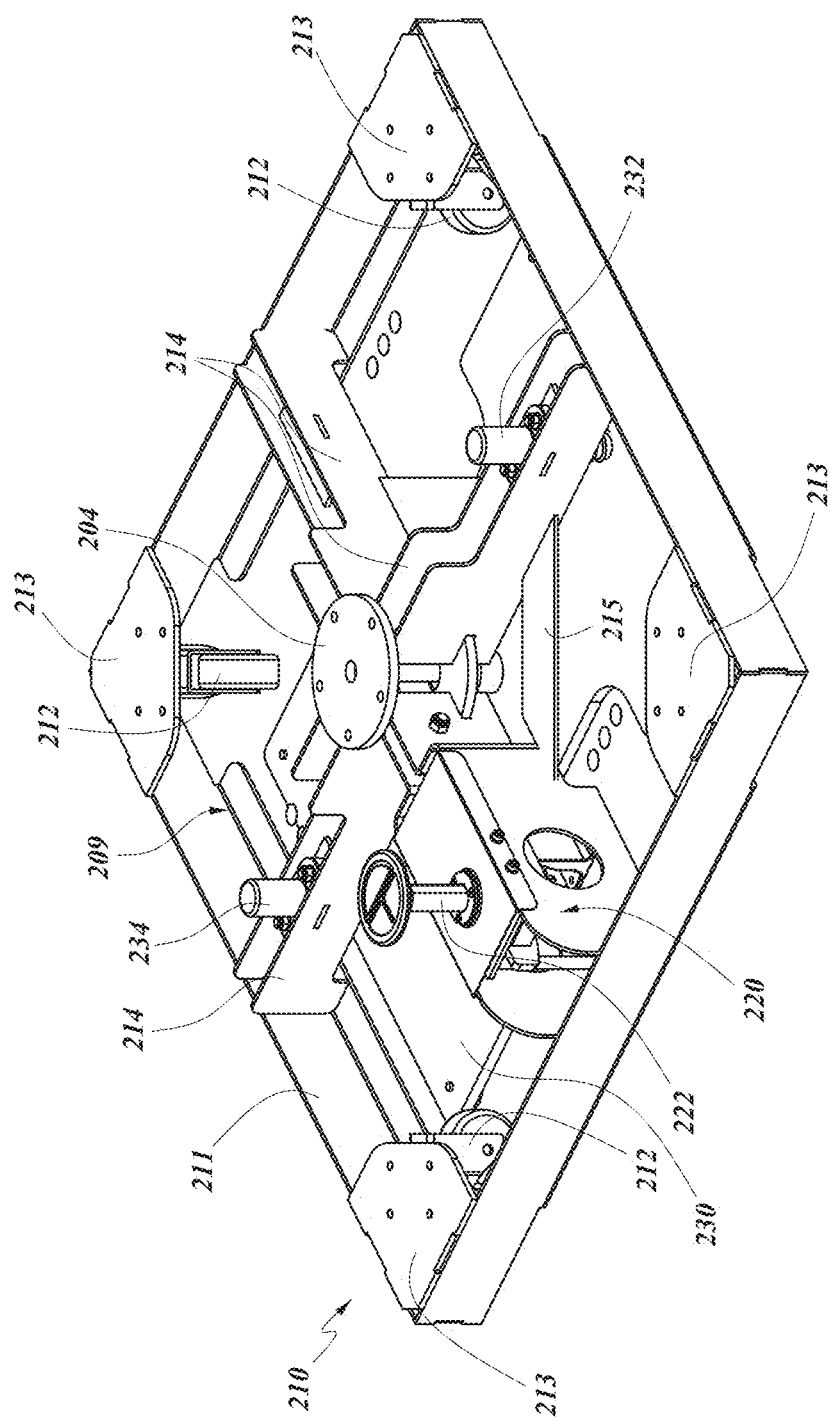
FIG. 13 shows the movable base of FIG. 11 with ballast members, which may include weights or tanks, removed.

FIG. 13 illustrates the frame 210 and the brake assembly 220 in further detail, with the ballast weights 208 removed for clarity. The frame 210 can include a plurality of wheels 212 (e.g., caster wheels). The wheels 212 can be assembled with the frame 210 and configured to support the weight of the movable base 200 and the umbrella. The outer peripheral frame 211 can be coupled with one or more shelves 213 for supporting the wheels 212. In one implementation, the shelves 213 can be located at corners of the outer peripheral frame 211 and can be disposed over a space to provide a secure connection for the wheels 212 within the space beneath the shelve 213.

The frame 210 can include a plurality of struts, such as radial support members 214. The radial support members 214 can extend between a central portion of the frame 210 that includes the mounting location 204 and the outer peripheral frame 211 or across the outer peripheral frame portion 211. The frame 210 can also include a plurality of other supports and struts for added structural stability and/or connection between the central portion and the outer peripheral frame portion 211. The radial support members 214 can include one or more plates (e.g., metal or plastic plates) that are oriented perpendicularly with the ground and perpendicularly with the outer peripheral frame portion 211. This can provide substantial structural rigidity (in the vertical direction) to the frame 210. The plates can also include one or more struts 215 coupling together pairs of plates. The radial support members 214 can also define spaces that nest the ballast weights 208.

The brake assembly 220 can be coupled with one or more of the radial support members 214, the outer peripheral frame portion 211 and/or the central portion. The brake assembly 220 can be assembled within an interior space 209 of the frame 210. The interior space 209 can be located between an upper portion (such as that defined by the shielding 202) and a lowermost portion (such as a lower edge of the outer peripheral frame 211).

Figure 14:
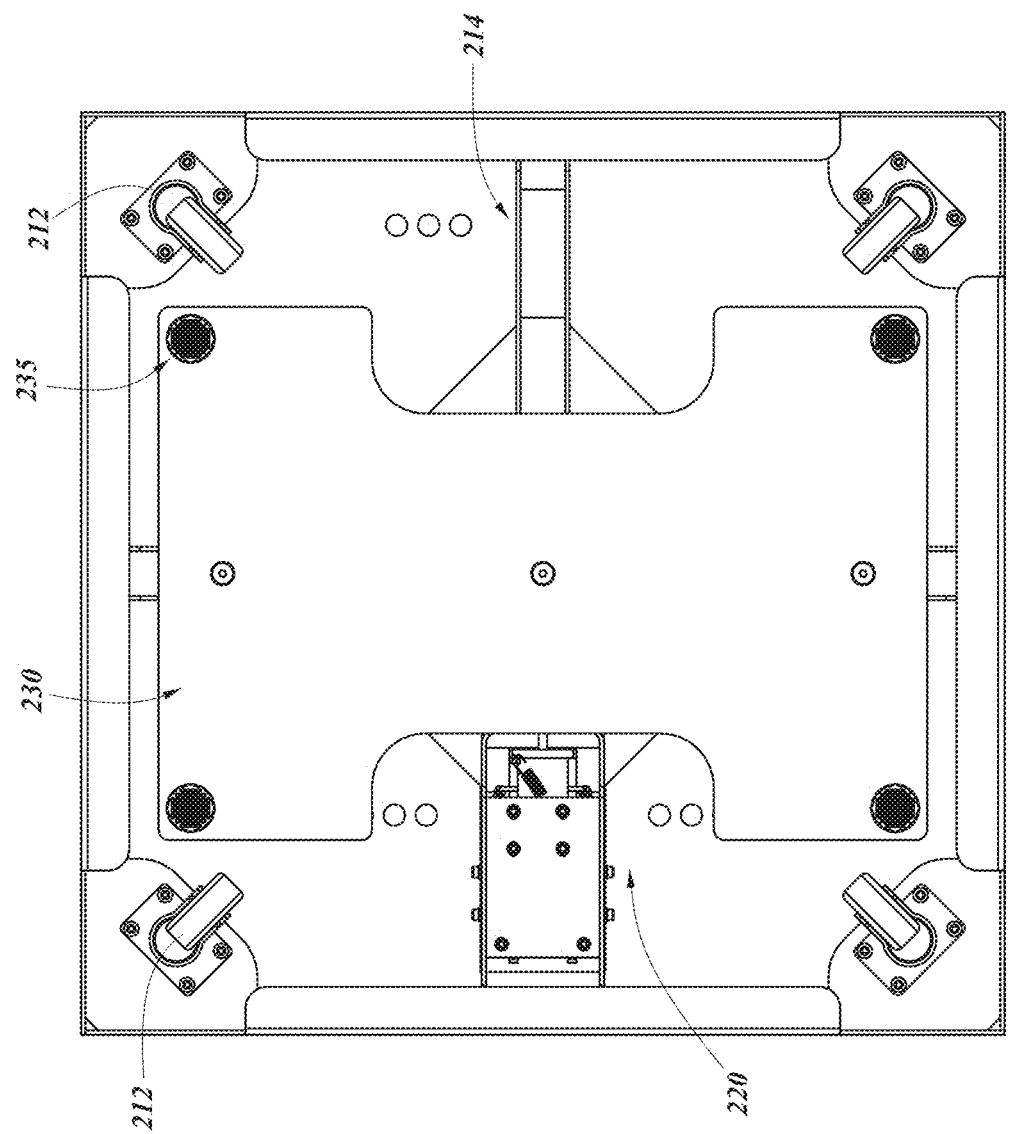
FIG. 14 is a bottom perspective view of a frame of the movable base of FIG. 11.

The brake assembly 220 can include a brake plate 230, which can be configured as a contact member or assembly that engages with the ground to prevent movement of the movable base 100 with respect to the ground. A lower surface of the brake plate 230 can include contact members 235 as shown in FIG. 14 and discussed below. The brake plate 230 can be coupled with one or more members for storing strain energy, such as spring mechanisms 232, 234. The spring mechanisms 232, 234 can couple between the brake plate 230 and the frame 210. The spring mechanisms 232, 234 can couple with the frame 210 at one or more of the radial support members 214. The spring mechanisms 232, 234 can be biased to either engage (press) the brake plate 230 with (onto or into) the ground or to disengage (lift) the brake plate 230 away from the ground. The spring mechanisms 232, 234 can be mounted between two or more of the structural plates of the radial support members 214. Similarly, other components of the brake assembly 220 can be mounted on one or more of the plates of the radial support members 214. The spring mechanisms 232, 234 can include a spring (e.g., coiled wire, leaf spring, or other type), a guide rod disposed in the spring, and one or more couplings/plates for attachment with the frame 110 and/or brake plate 230.

FIG. 14 illustrates a bottom of the frame 210 showing greater detail of the brake plate 230. The brake plate 230 can include one or more ground contact members 235 for engaging with the ground surface. Although illustrated with four ground contact members 235, the plate 230 can include one or more ground contact members 235, located in any position on the underside of the brake plate 230. The ground contact members 235 can be formed of a plastic, rubber or other material that can have high friction and/or low wear properties. The brake plate 230 can be formed of a heavy, stiff material, such as a metal. Alternatively, the brake plate 230 is not a solid plate, but instead comprises or more linear members assembled in a grid-like (or other) assembly or structure.

Figure 15A:
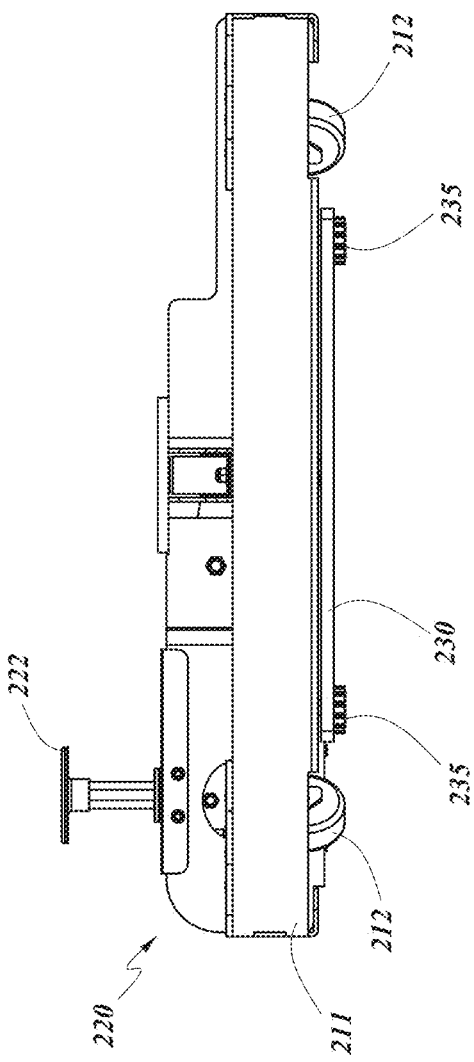
FIG. 15A is a side elevation view of the frame showing a brake assembly in an engaged position.

FIG. 15A shows the brake assembly 220 in an engaged position. In the engaged position the brake pad 230 is lowered into contact with the ground. The brake plate 230 and/or ground contact members 235 can be at or below a lower level of the wheels 212. In some implementations, the brake assembly 220 can lift the wheels 212 off of the ground, although this is not required to engage the brake plate 230 or contact members 235 with the ground in the engaged position. In the engaged position, the ballast weights 208 and the umbrella weight can be primarily, or at least partially, directed to the ground through the brake plate 230 rather than through only the wheels 212. Engagement of the brake plate 230 with the ground can prevent movement of the base 200 across the ground through the frictional engagement between the ground and the brake plate 230 and/or contact members 235. The spring mechanisms 232, 234 can control the amount of force applied to the ground surface through the brake assembly 220. Where the spring mechanisms 232, 234 bias the brake plate 230 into the ground, the force applied to the ground (e.g., weight of the movable base 200 and the umbrella, etc.) can be proportional to the product of the linear compression of the coiled springs of the spring mechanisms 232, 234 and the spring constant of the springs (e.g., through Hooke's Law). Accordingly, the spring mechanisms 232, 234 can be designed to function based on the geometry of the brake assembly 220 (amount extension of the brake plate 230 below the wheels 212) and/or the weight of the movable base 200 and umbrella coupled thereto or the base 200 alone. The spring mechanisms can be configured to act independently and/or can have different properties to adapt to uneven ground surfaces. The foot pedal 222 can be in a raised position in the engaged position.

Figure 15B:
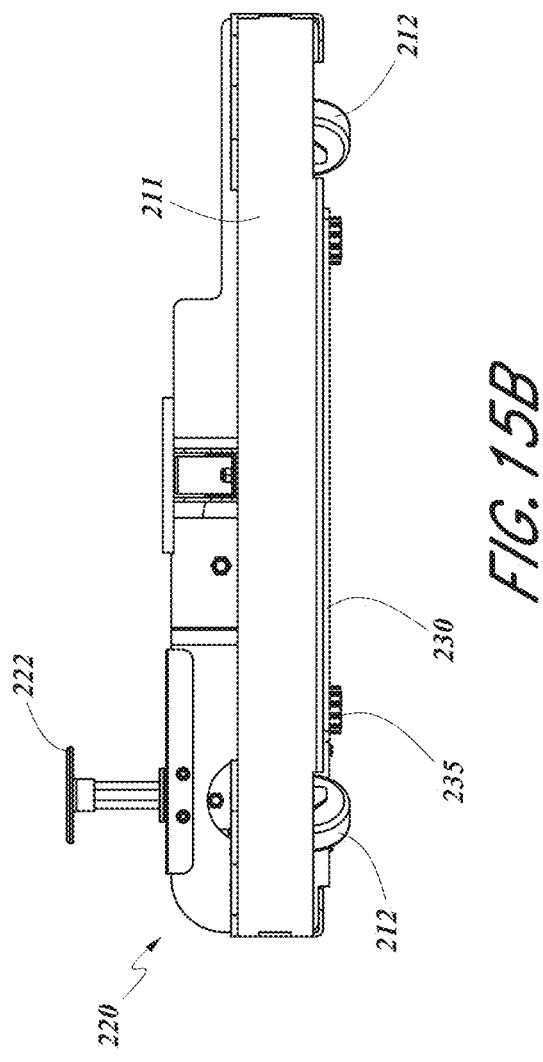
FIG. 15B is a side elevation view of the frame showing the brake assembly in a disengaged position.
Figure 16:
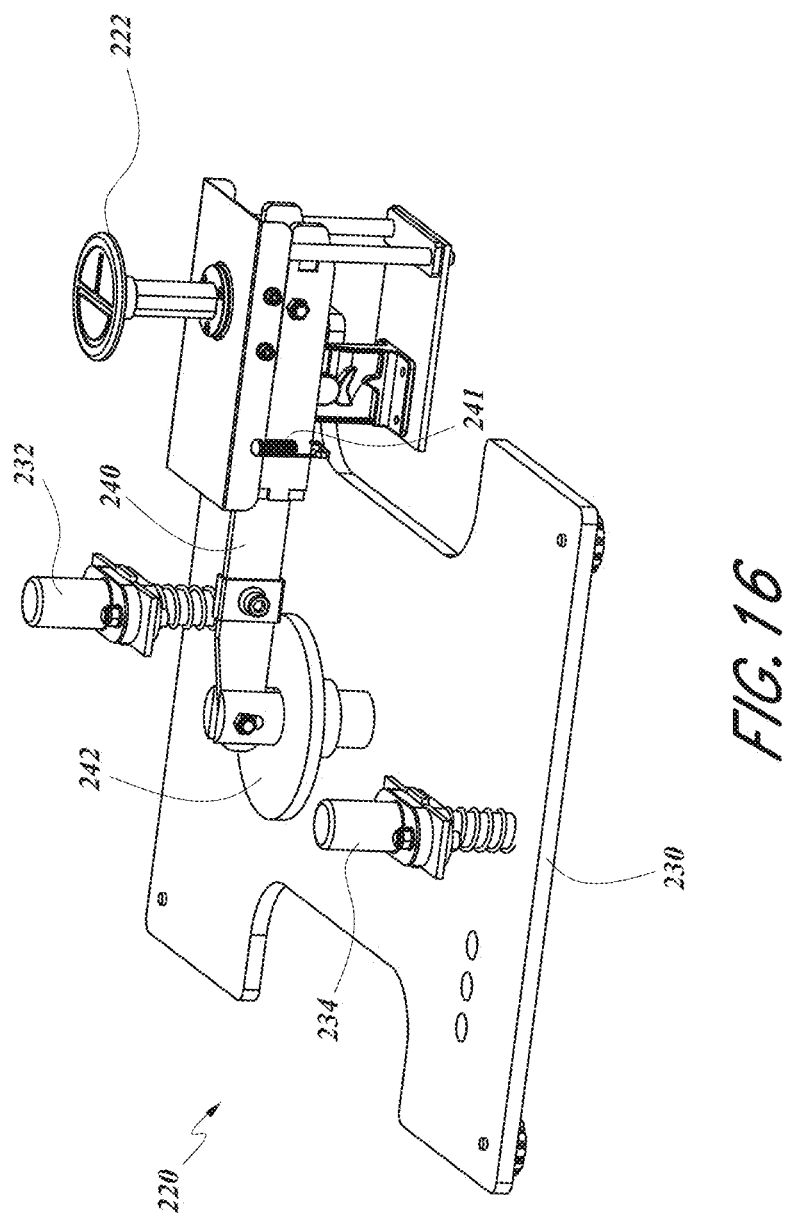
FIG. 16 is a perspective view of the brake assembly of the movable base of FIG. 11.
Figure 17:
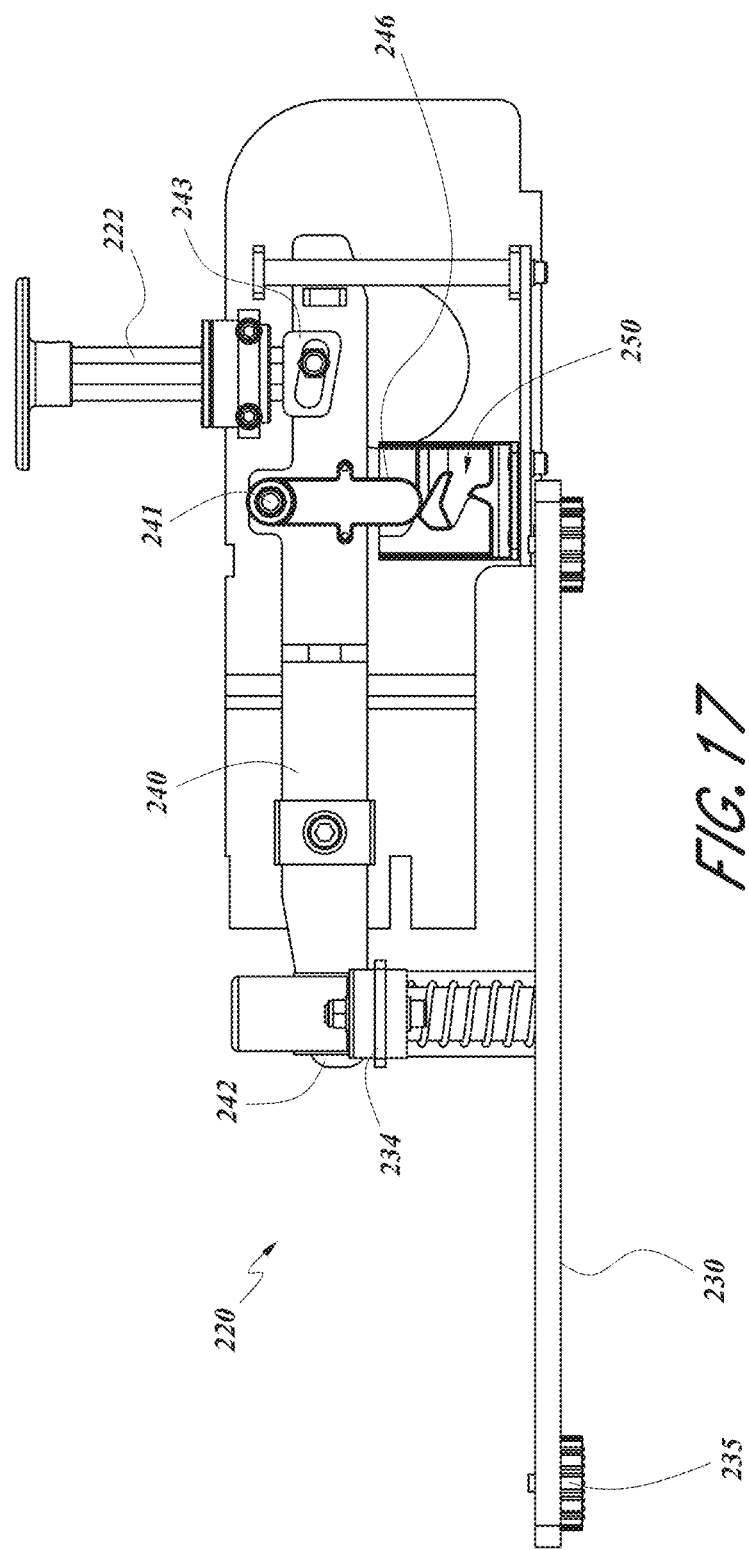
FIG. 17 is a side elevation view of the brake assembly in the engaged position.
Figure 18:
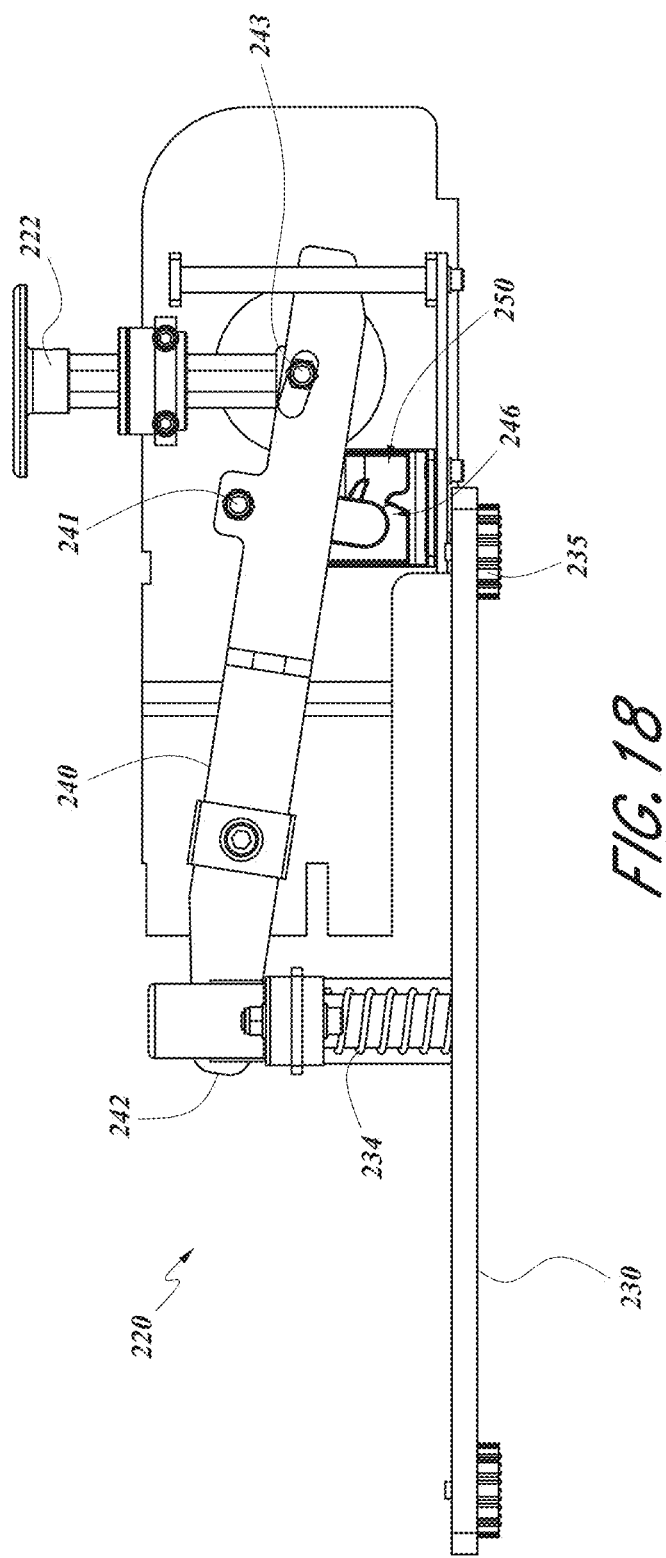
FIG. 18 is a side elevation view of the brake assembly in the disengaged position with a foot pedal depressed.

FIG. 15B shows the brake assembly 220 in the disengaged position. The brake pad 230 can be raised to disengage from the ground in the disengaged position. In the disengaged position, the wheels 212 engage the ground and the brake pad 235 and the brake plate 230 are disengaged from the ground, e.g., providing a space between the pads 235 and the ground or at least a reduction in contact for by an amount sufficient to enable rolling of the movable base on the wheels 212. In the disengaged position, the weight of the ballast material and the umbrella frame is substantially or entirely through the wheels 212, rather than through the brake assembly 220. The foot pedal 222 can be depressed in the engaged position.

FIGS. 16-20 show the brake assembly 220 in further detail. The brake assembly 220 can include a lever arm 240. The lever arm 240 can pivotally connect at a first end 243 with the foot pedal 222 and at a second end 242 with the brake plate 230. The lever arm 240 can include a fulcrum that couples with the frame 210, such as at one or more of the radial support members 214. The fulcrum can be a pivoting location for the lever arm 240. When the foot pedal 222 is depressed, the first end 243 can be depressed and the second end 242 can be raised. The lever arm 240 can raise the brake plate 230 to the disengaged position. The foot pedal 222 can be coupled with the lever arm 240 through a vertical post and/or a telescoping post arrangement. For example, the foot pedal 222 can be stowable within the shielding 202 and/or extend upwardly therethrough for use. In one arrangement, the lever arm 240 can be of a length such that the foot pedal is disposed beyond the outer peripheral portion 211.

Raising of the brake plate can compress the springs 232, 234. Raising the foot pedal 222 can lower the second end 242 to engage the brake plate 230 toward or into the ground in the engaged position. Other implementations of the brake assembly 220 can alternatively include additional links/members for lifting the brake plate 230. The foot pedal can be raised/depressed in a substantially vertical manner. The first end 243 can include a slot to accommodate for the radial arc of the lever arm 240 at its connection with the foot pedal 222. The lever arm 240 can include one or more springs 241 to bias the foot pedal in the raised or depressed positions.

The foot pedal 222, the brake plate 230, and/or the lever arm 240 can engage with a locking device 250 to hold the position of the lever arm 240 in at least one of the engaged/disengaged positions. As shown most fully in FIGS. 20A-C, the locking mechanism 250 can include an upper sloped surface 252, a catch surface 261 and/or a return surface 255. A locking pin 246 can couple with the brake plate 230, lever arm 240 or foot pedal 222 and interact with the locking mechanism 250. The locking pin 246 can be pivotally coupled with the lever arm 240 at a pivot location 247. One or more springs 248, 249 can be coupled with the pin 246 for controlling a position of an outer end 253 of the pin 246 opposite the pivot location 247. The one or more springs 248, 249 can be mounted on opposite sides of the pin 246.

In one implementations, the outer end 253 is centered over the locking device 250 by the one or more springs 248, 249.

Figure 19A:
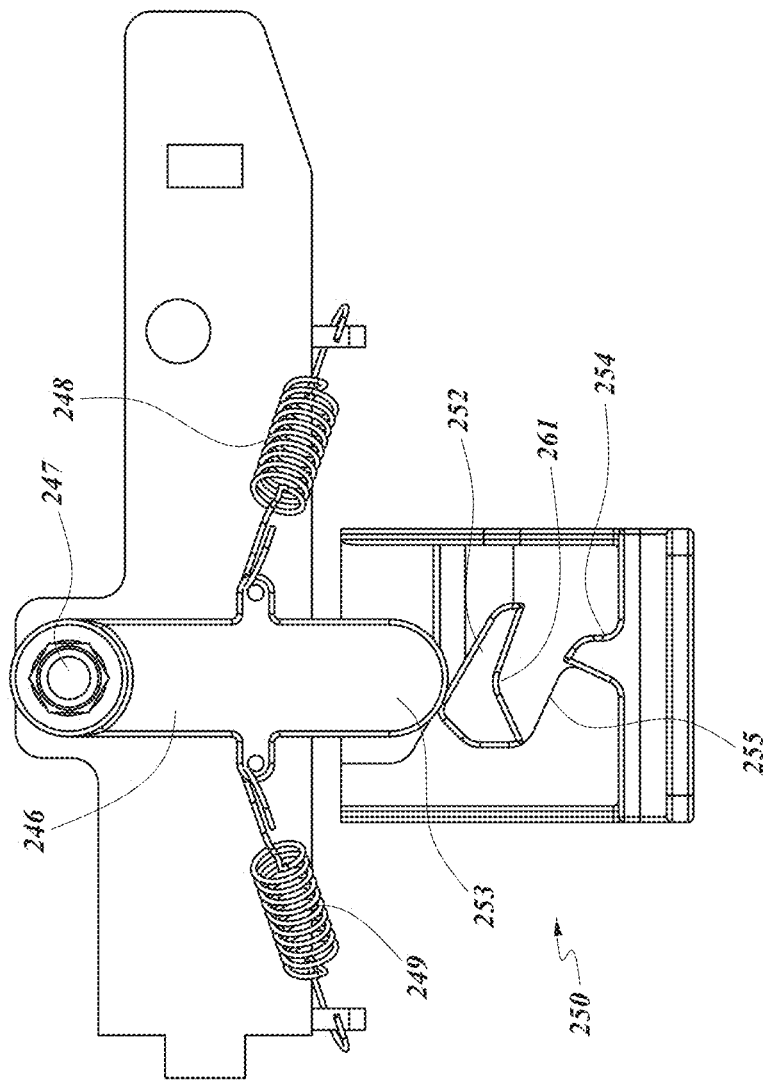
FIG. 19A shows a detailed view of a locking mechanism of the brake assembly of FIG. 16.
Figure 19B:
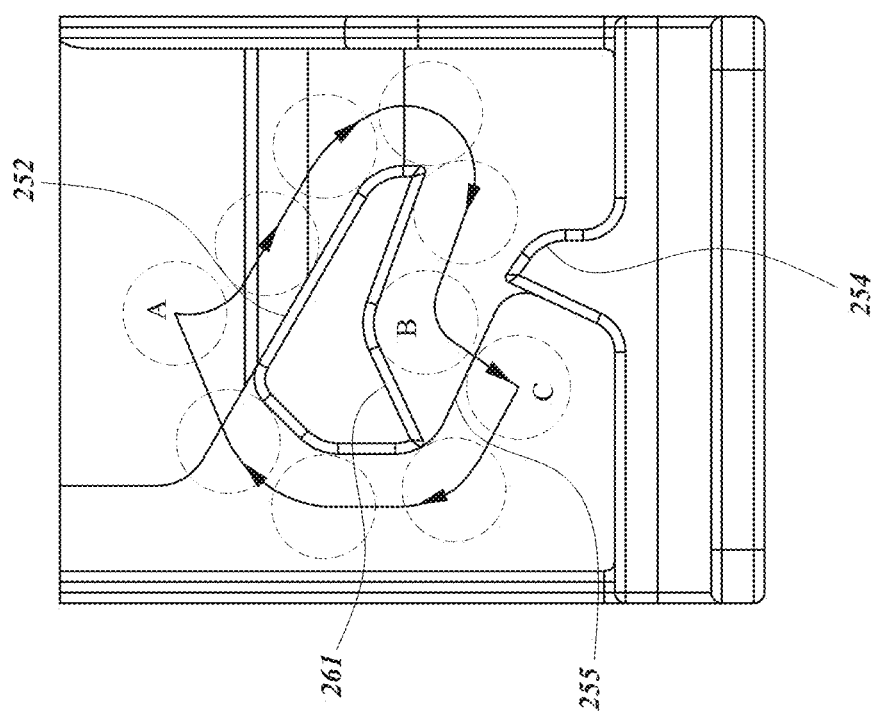
FIG. 19B shows a further detailed view of a path of a locking mechanism of the brake assembly of FIG. 16.
Figure 20C:
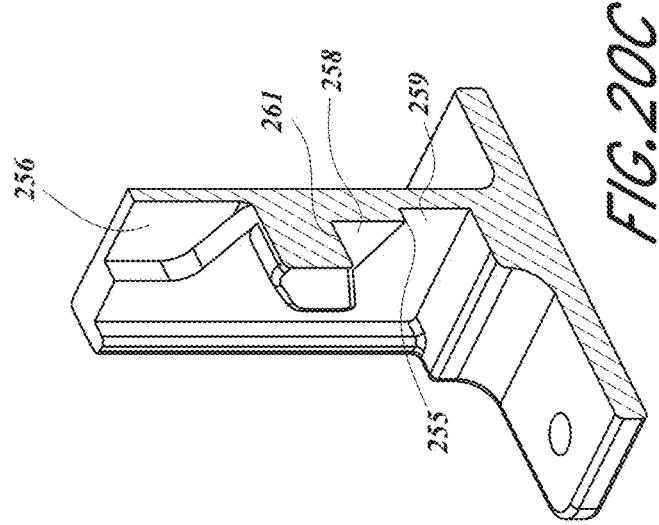
FIG. 20C shows another cross-section of the locking mechanism.
Figure 20B:
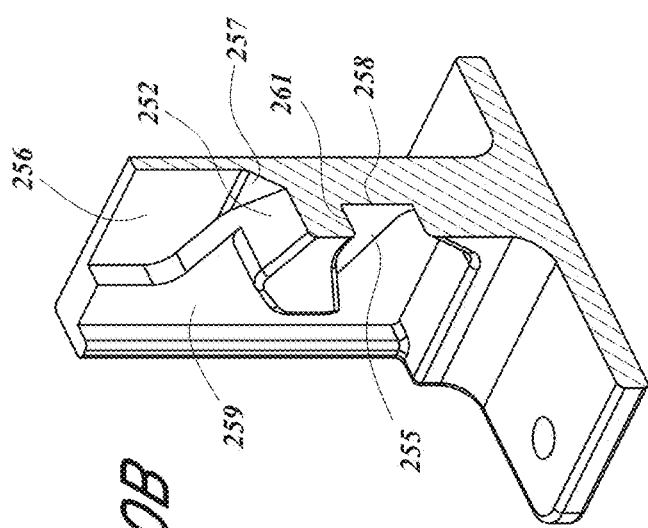
FIG. 20B shows a cross-section of the locking mechanism.
Figure 20A:
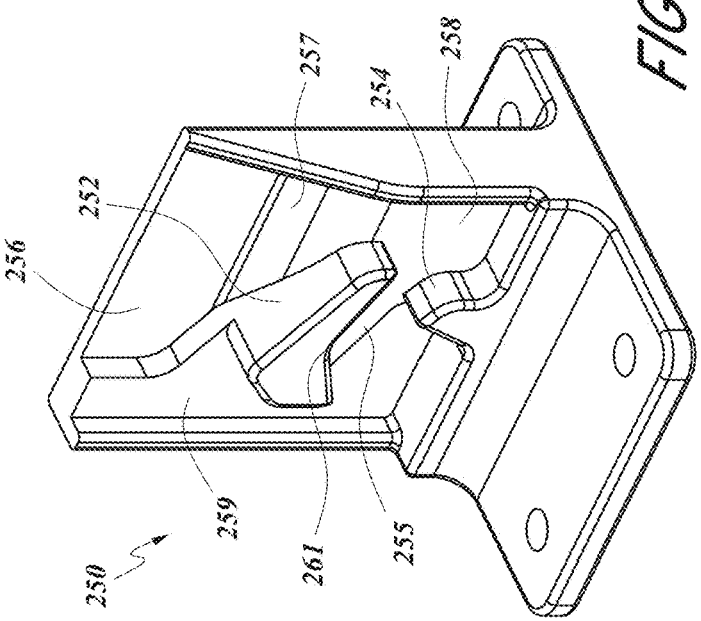
FIG. 20A shows a perspective view of the locking mechanism.

The locking mechanism 250 can operate as follows. The outer end 253 of the pin 246 can sequentially engage with the upper sloped surface 252, the catch surface 261, and/or the return surface 255. As shown in FIG. 19B, the outer end 253 can start at position A. Position A can correspond to the engaged position of the brake plate 230 and/or the raised position of the foot pedal 222. Depression of the foot pedal 222 by the user can lower the outer end 253 into the locking device 250. The outer end 253 can slide along the upper sloped surface 252. After passing beneath the upper sloped surface 252, the one or more of the springs 248, 249 can guide the outer end 253 engaged the catch surface 261. The catch surface 261 can be a concavity. The user can also release the foot pedal 222 and allow the outer end 253 to be raised to position B. In position B, the pin 246 is at least temporarily engaged with the catch surface 261. In position B, the foot pedal 222 and the lever arm 240 can be in the depressed position corresponding to the disengaged position of the brake plate 230. To arrive at position B from position A, the outer end 253 can change from a first elevation 256 on the locking mechanisms, through a sloped elevation section 257, to a second elevation 258. The catch surface 261 can be at the second elevation 258. The springs 241, the springs 232, 234 and/or weight of the brake plate 230 can bias the outer end 253 securely into the catch surface 261 to maintain positions B.

With the outer end 253 in position B, the user can depress the foot pedal 222 and the outer end 253 can be lowered and/or change elevation to engage with the return surface 255. The return surface 255 can be at a third elevation 259. The third elevation 259 can be between the first and second elevations 256, 258. A lower surface 254 can be included to prevent (e.g., block) the outer end 253 from prematurely engaging with the return surface 255. The outer end 253 can catch the return surface 261 at position C. The return surface 255 can return the outer end 253 to position A at the first elevation 256. In other implementations, the locking device 250 can include multiple catch surfaces, each corresponding to an extension or lifting of the brake plate 230. Once the pin is back at position A, corresponding the engaged position of the brake assembly 220, the user can repeat the process (depressing the foot pedal 222) to return to the disengaged position for the brake assembly 220.

Certain Terminology

Terms of orientation used herein, such as "top," "bottom," "proximal," "distal," "longitudinal," "lateral," and "end," are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Several illustrative embodiments of movable bases have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Some embodiments have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular embodiment of the inventions disclosed herein. No aspects of this disclosure are essential or indispensable. In many embodiments, the devices, systems, and methods may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible. Any of the features, structures, steps, or processes disclosed in this specification can be included in any embodiment.

In summary, various embodiments and examples of movable bases and related methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above but should be determined only by a fair reading of the claims.

What is claimed is:

1. A movable base, comprising
   a frame having a mount for supporting a shade structure and including:
   a plurality of wheels coupled to a lower portion of the frame, the wheels configured to support the frame on a ground surface;
   a plurality of struts coupled between an outer periphery of the frame and the mount;
   a brake assembly, comprising:
   a brake plate configured for engaging the ground surface, the brake plate movable relative to the frame and the wheels between a disengaged position configured to be above the ground surface and an engaged position configured to contact the ground surface;
   a lever arm pivotably coupled with one of the struts, a first end of the lever arm coupled with a foot pedal, a second end of the lever arm coupled with the brake plate;
   a locking device coupled to the frame;
   wherein the locking device alternately secures the brake plate in the disengaged position above the ground surface and in the engaged position with the ground surface, in the disengaged position the foot pedal is in a depressed configuration, and in the engaged position the foot pedal is in a raised configuration, relative to the depressed configuration;
   wherein the foot pedal travels vertically between the raised and depressed configurations.

2. The movable base of claim 1, further comprising a plurality of spaced apart ground contact members coupled with a lower portion of the brake plate, the plurality of spaced apart ground contact members configured for contacting with the ground surface.

3. The movable base of claim 2, further comprising a member for storing strain energy disposed between the brake plate and the frame to bias the plurality of spaced apart ground contact members into contact with the ground surface.

4. The movable base of claim 1, wherein the locking device comprises a catch surface configured to retain the foot pedal in the depressed configuration and the brake plate in the disengaged configuration.

5. The movable base of claim 4, wherein the locking device comprises a pin coupled with the lever arm for engaging the catch surface.

6. The movable base of claim 5, wherein the locking device comprises an upper sloped surface to guide the pin to the catch surface as the foot pedal is depressed and a return surface to guide the pin out of the catch surface as the foot pedal is raised.

7. The movable base of claim 6, wherein the locking device is configured such that depressing the foot pedal a first time disengages the brake plate from the ground surface and depressing the foot pedal a second time engages the brake plate with the ground surface.

8. The movable base of claim 7, wherein the locking device is configured such that depressing the foot pedal a third time disengages the brake plate from the ground surface.

9. The movable base of claim 1, wherein the foot pedal is disposed above an upper portion of the frame in the raised and depressed configurations.

10. A movable base, comprising
a frame having a mount for supporting a shade structure;
a plurality of wheels coupled to a lower portion of the frame;
a brake assembly, comprising:
  a linkage assembly, the linkage assembly including an upper member coupled with the frame, a lower member for engaging with a ground surface, and a plurality of links pivotably coupling with the upper member and lower member;
  a lever arm having a first end and a second end, the first end on the lever arm pivotably coupled with the upper member and a central portion of the lever arm engaged with a cross bar extending from the lower member;
  a foot pedal at the second end of the lever arm;
  a locking device, the locking device engaging with the lever arm to hold the lever arm in a locked position;
  wherein rotation of the lever arm in a first direction extends the lower member away from the frame and into contact with the ground surface in the locked position and lifts the frame and the wheels relative to the ground surface, and releasing of the lever arm from the locked position lowers the frame and wheels into contact with the ground surface, the frame supported on the wheels.

11. The movable base of claim 10, further comprising:
a second linkage assembly, the second linkage assembly including an upper member coupled with the frame, a lower member for engaging with the ground surface, and a plurality of links pivotably coupling between the upper and lower members, the lower members of the first and second linkage assemblies coupled with the cross bar such that both are operable by the lever arm.

12. A movable base, comprising
a frame, the frame having an upper portion, a lower portion, an outer peripheral portion and a plurality of supporting struts;
an internal space, at least partially defined by the upper portion, lower portion, and the outer peripheral portion;
a plurality of wheels coupled to the frame for supporting the frame on a ground surface;
a brake assembly, comprising:
  a contact assembly including plurality of spaced apart ground contact members, the contact assembly having an engaged position in which the ground contact members are in contact with the ground surface and a disengaged position in which the ground contact members are spaced above the ground surface, the ground contact members being movable relative to the frame and the wheels between the engaged and disengaged positions;
  a lever arm coupled at a first end to the contact assembly, the lever arm pivoting between first and second positions and disposed within the internal space;
  a foot pedal coupled with a second end of the lever arm opposite the first end; and
  a locking device coupled to the lever arm to alternately secure the lever arm in the first position and in the second position;
  wherein in the engaged position of the contact assembly, the lever arm is in the first position and in the disengaged position of the contact assembly, the lever arm is in the second position.

13. The movable base of claim 12, further comprising a member for storing strain energy disposed between the frame and the plurality of spaced apart ground contact members to bias the plurality of spaced apart ground contact members into contact with the ground surface.

14. The movable base of claim 12, wherein the contact assembly comprises a first bar having a first plurality of spaced apart ground contact members and a second bar having second plurality of spaced apart ground contact members, the first bar and the second bar being coupled by a cross bar, the lever arm acting on at least one of the first bar, the second and the cross bar to move the contact assembly between the first and second positions thereof.

15. The movable base of claim 14, wherein the first end of the lever arm comprise a first forked member and a second forked member, the first and second forked members pivotably coupled with the frame.

16. The movable base of claim 15, wherein a first portion of the first forked member is coupled with a first lateral portion of the frame and a second portion of the first forked member is engaged with the cross bar of the contact assembly, and a first portion of the second forked member is coupled with a second forked portion of the frame and a second portion of the second forked member is engaged with the cross bar of the contact assembly.

17. The movable base of claim 16, wherein the first bar and the second bar are part of a linkage pivotably coupled to the frame.

18. The movable base of claim 17, wherein the linkage comprises a four-bar assembly.

19. The movable base of claim 18, wherein the locking device comprises a latch member.

20. The movable base of claim 19, further comprising a foot-pedal coupled with the second end of the lever arm.

21. The movable base of claim 20, wherein the foot pedal is a first foot pedal and the locking device comprises a vertical post coupled with the second end of the lever arm, the vertical post configured to engage a second foot pedal when the contact assembly is in one or both of the first position and the second position.

22. A movable base, comprising
a frame, the frame having an upper portion, a lower portion, an outer peripheral portion and a plurality of supporting struts;
an internal space, at least partially defined by the upper portion, lower portion, and the outer peripheral portion;
a plurality of wheels coupled to the frame for supporting the frame on a ground surface;
a brake assembly, comprising:
  a contact assembly including plurality of spaced apart ground contact members, the contact assembly having an engaged position in which the ground contact members are in contact with the ground surface and a disengaged position in which the ground contact members are spaced above the ground surface;
  a lever arm coupled at a first end to the contact assembly, the lever arm pivoting between first and second positions and disposed within the internal space;
  a foot pedal coupled with a second end of the lever arm opposite the first end; and
  a locking device coupled to the lever arm to alternately secure the lever arm in the first position and in the second position;
  wherein in the engaged position of the contact assembly, the lever arm is in the first position and in the disengaged position of the contact assembly, the lever arm is in the second position; and wherein the contact assembly comprises a first bar having a first plurality of spaced apart ground contact members and a second bar having second plurality of spaced apart ground contact members, the first bar and the second bar being coupled by a cross bar, the lever arm acting on the cross bar to move the contact assembly between the engaged and disengaged positions;

wherein the first end of the lever arm comprise a first forked member and a second forked member, the first and second forked members pivotably coupled with the frame.

23. The movable base of claim 22, wherein the first bar and the second bar are part of a four-bar linkage assembly.

* * * * *